(12) United States Patent
Katoh et al.

(10) Patent No.: US 9,217,091 B2
(45) Date of Patent: Dec. 22, 2015

(54) INKJET RECORDING INK AND INK CARTRIDGE USING THE INK, INKJET RECORDING APPARATUS, INKJET RECORDING METHOD AND INK RECORDED MATTER

(71) Applicants: Keita Katoh, Shizuoka (JP); Mitsuru Naruse, Shizuoka (JP); Akihiko Matsuyama, Shizuoka (JP); Masayasu Nonogaki, Shizuoka (JP); Minoru Hakiri, Shizuoka (JP); Yuusuke Koizuka, Shizuoka (JP); Kazukiyo Nagai, Shizuoka (JP); Nobuyuki Sakamoto, Ibaraki (JP); Yosuke Matsuoka, Ibaraki (JP); Masatomo Takahashi, Ibaraki (JP)

(72) Inventors: Keita Katoh, Shizuoka (JP); Mitsuru Naruse, Shizuoka (JP); Akihiko Matsuyama, Shizuoka (JP); Masayasu Nonogaki, Shizuoka (JP); Minoru Hakiri, Shizuoka (JP); Yuusuke Koizuka, Shizuoka (JP); Kazukiyo Nagai, Shizuoka (JP); Nobuyuki Sakamoto, Ibaraki (JP); Yosuke Matsuoka, Ibaraki (JP); Masatomo Takahashi, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 96 days.

(21) Appl. No.: 14/202,322

(22) Filed: Mar. 10, 2014

(65) Prior Publication Data
US 2014/0275401 A1 Sep. 18, 2014

(30) Foreign Application Priority Data

Mar. 14, 2013 (JP) ................. 2013-051462

(51) Int. Cl.
*C09D 11/326* (2014.01)
*C09D 11/107* (2014.01)
(52) U.S. Cl.
CPC ............ *C09D 11/326* (2013.01); *C09D 11/107* (2013.01)
(58) Field of Classification Search
CPC ....................... C09D 11/326; C09D 11/107
See application file for complete search history.

(56) References Cited

U.S. PATENT DOCUMENTS 4,246,154 A * 1/1981 Yao .................. 524/88
2002/0075369 A1 6/2002 Ota et al.
2003/0029355 A1* 2/2003 Miyabayashi ............. 106/31.27
2009/0088521 A1 4/2009 Hosokawa et al.
2010/0165020 A1 7/2010 Tojo et al.
2011/0045184 A1 2/2011 Kakino et al.
2011/0193912 A1 8/2011 Sakai et al.

FOREIGN PATENT DOCUMENTS

| CN | 101457051 A | 6/2009 |
|---|---|---|
| EP | 2305760 | 4/2011 |
| JP | 2003-147243 | 5/2003 |
| JP | 2007-153985 | 6/2007 |
| JP | 2009-084494 | 4/2009 |
| JP | 2010-155928 | 7/2010 |
| JP | 2011-042735 | 3/2011 |
| JP | 2011-074256 | 4/2011 |
| JP | 2011-122072 | 6/2011 |
| JP | 2011-162692 | 8/2011 |

OTHER PUBLICATIONS

Apr. 30, 2015 Chinese office action in corresponding Chinese Patent Application No. 201410096428.0.

* cited by examiner

*Primary Examiner* — Alexander Kollias
(74) *Attorney, Agent, or Firm* — Cooper & Dunham LLP

(57) ABSTRACT

An inkjet recording ink, including: water; a water-soluble solvent; a pigment; and a phosphate group-containing copolymer, wherein the phosphate group-containing copolymer includes a structural unit represented by the following general formula (1) and a structural unit represented by the following structural formula (1):

General formula (1)

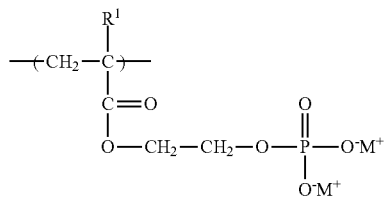

wherein, in the general formula (1), $R^1$ represents either of a hydrogen atom and a methyl group; and $M^+$ represents any of an alkali metal ion, an organic ammonium ion, an organic amine ion and a hydrogen ion, one-half or more of the $M^+$ in the copolymer is an alkali metal ion, an organic ammonium ion or an organic amine, and the remainder is a hydrogen ion:

Structural formula (1)

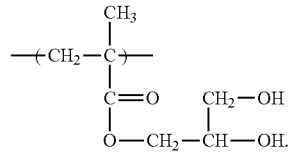

6 Claims, 4 Drawing Sheets

INKJET RECORDING INK AND INK CARTRIDGE USING THE INK, INKJET RECORDING APPARATUS, INKJET RECORDING METHOD AND INK RECORDED MATTER

BACKGROUND OF THE INVENTION

1. Field of the Invention

The present invention relates to an inkjet recording ink (hereinafter may be simply referred to as "ink"), and an ink cartridge using the ink, an inkjet recording apparatus, an inkjet recording method and an ink recorded matter.

2. Description of the Related Art

In recent years, as an image forming method, an inkjet recording method has come into wide use because the inkjet recording method is simpler in process and easier in printing in full color mode as compared to other methods, and has an advantage such that high resolution images can be obtained even with apparatuses simple in constitution. The inkjet recording method is such that small quantities of ink are allowed to fly with an inkjet recording apparatus and to attach onto a recording medium such as paper so as to form an image; the use of the inkjet recording method has expanded so as to cover personal and industrial printers and printing.

In an inkjet recording apparatus, aqueous inks using water-soluble dyes as coloring agents are used, and the dye inks involve drawbacks of being poor in weather resistance and water resistance. Accordingly, recently, there have been advanced researches on pigment inks using pigments in place of water-soluble dyes. However, the pigment inks are, as compared to dye inks, still poorer in terms of color developing property, ink ejection stability and ink storage stability. The improvement of the high image quality achieving technique of OA printers requires pigment inks to give image densities comparable with the image densities given by dye inks even for plain paper as a recording medium. However, when plain paper is used as recording media, pigment inks penetrate into the sheets of paper so as to lower the image density on the surface of the sheets of paper, and thus cause a problem such that the image density is lowered. For the purpose of increasing the drying rate of the ink adhering onto a recording medium in order to achieve high speed printing, a technique is adopted in which a penetrating agent is added to the ink to facilitate the penetration of the water in the ink into the recording medium so as to promote the drying of the ink; however, in this case, the penetrability of the pigment as well as the penetrability of water is enhanced to cause a phenomenon of further decreasing the image density.

For the improvement of the image density, various methods have been proposed. For example, there has been proposed an aqueous inkjet recording ink which includes, as essential components, carbon black or an organic pigment, a polymer, a basic substance and water (see, Japanese Patent Application Laid-Open (JP-A) Na 2007-153986). The ink based on this proposal is characterized by including a copolymer prepared by polymerizing, as essential components, a (meth)acrylic acid and another copolymerizable monoethylenic unsaturated monomer, and a copolymer prepared by copolymerizing, as essential components, a phosphate group-containing monoethylenic unsaturated monomer and another copolymerizable monoethylenic unsaturated monomer.

According to the method of Japanese Patent Application Laid-Open (JP-A) No. 2007-153985, when the content of the phosphate group-containing monoethylenic unsaturated monomer in the copolymer is low, no sufficient image density is obtained. When the content of the phosphate group-containing monoethylenic unsaturated monomer in the copolymer is increased, the image density is improved, but the dispersion condition of carbon black or the organic pigment in the ink comes to be unstable. No compatibility is achieved between the high image density and the dispersion stability of the pigment as a pigment dispersion and a pigment ink.

Alternatively, an ink has been proposed which is used for recording on paper, including a water-soluble multivalent metal salt (Japanese Patent Application Laid-Open (JP-A) No. 2011-122072). The ink based on this proposal include a pigment (a) and at least a compound (b) having no surface activity, having a molecular weight of 150 or more and 10,000 or less, and having a functional group selected from a functional group whose basic skeleton is phosphoric acid and a functional group whose basic skeleton is phosphonic acid wherein the content of phosphorus ((P content/molecular weight)×100) derived from the functional group whose basic skeleton is phosphoric acid or the functional group whose basic skeleton is phosphonic acid in the molecular structure of the compound is 1.4 or more, and the content of the (b) compound is 1.5% by mass or more and 10.0% by mass or less in relation to the total mass of the ink.

However, the method of the foregoing proposal results in an insufficient improvement of the image density for plain paper having a low content of the water-soluble multivalent metal salt. The use of the compound having the functional group selected from the functional group whose basic skeleton is phosphoric acid and the functional group whose basic skeleton is phosphonic acid improves the image density, but causes a problem such that the pigment dispersion and the dispersion condition of the pigment in the ink come to be unstable.

Accordingly, it is desired to provide an inkjet recording ink, capable of achieving the compatibility between the high image density on plain paper and the improvement of the storage stability of the pigment dispersion and the ink.

SUMMARY OF THE INVENTION

The present invention takes as its object the provision of an inkjet recording ink, capable of giving a high image density on plain paper and satisfactory in the storage stability of pigment dispersion and the ink.

The inkjet recording ink of the present invention, for achieving the foregoing object includes water, a water-soluble solvent, a pigment and a phosphate group-containing copolymer, wherein the phosphate group-containing copolymer includes a structural unit represented by the following general formula (1) and a structural unit represented by the following structural formula (1):

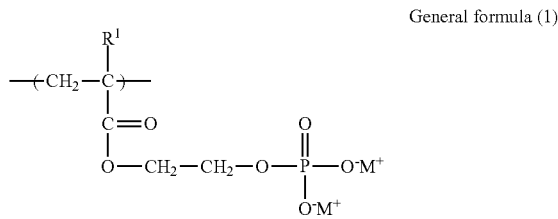

General formula (1)

wherein, in the general formula (1), $R^1$ represents either of a hydrogen atom and a methyl group; $M^+$ represents any of an alkali metal ion, an organic ammonium ion, an organic amine ion and a hydrogen ion; and one-half or more of the $M^+$ in the copolymer is any of an alkali metal ion, an organic ammonium ion and an organic amine, and the remainder is a hydrogen ion;

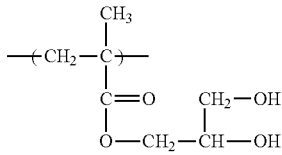

Structural formula (1)

According to the present invention, it is possible to provide an inkjet recording ink, capable of solving the various conventional problems, capable of achieving the foregoing object, capable of obtaining a high image density on plain paper, and satisfactory in the storage stability of the pigment dispersion and the ink.

DETAILED DESCRIPTION OF THE INVENTION

Inkjet Recording Ink

Figure 1:
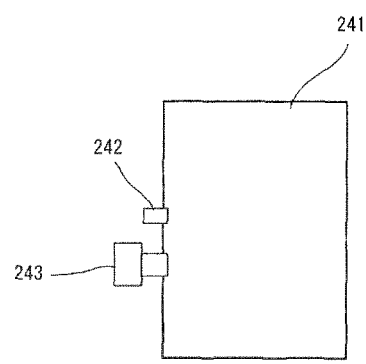
FIG. 1 is a schematic view illustrating an example of an ink cartridge.

The inkjet recording ink of the present invention includes at least water, a water-soluble solvent, a pigment and a phosphate group-containing copolymer, and further includes, if necessary, other components.

The phosphate group-containing copolymer includes at least the structural unit represented by the following general formula (1) and the structural unit represented by the following structural formula (1):

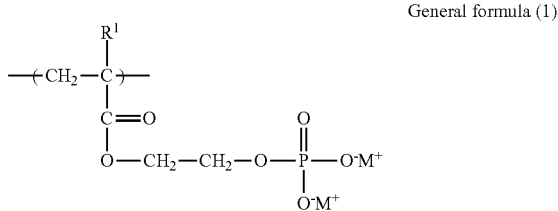

General formula (1)

wherein, in the general formula (1), $R^1$ represents any of a hydrogen atom and a methyl group; $M^+$ represents any of an alkali metal ion, an organic ammonium ion, an organic amine ion and a hydrogen ion; and one-half or more of the $M^+$ in the copolymer is any of an alkali metal ion, an organic ammonium ion and an organic amine, and the remainder is a hydrogen ion;

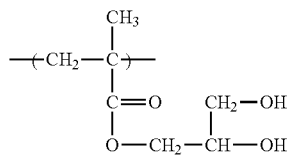

Structural formula (1)

The phosphate group included in the structural unit represented by the general formula (1) exhibits hydrophilicity, but has a feature to react with an ion such as calcium ion, magnesium ion or aluminum ion to be hydrophobized. Accordingly, when an inkjet recording ink using a phosphate group-containing copolymer as a pigment dispersant is used for a recording medium including a water-soluble multivalent metal salt, the pigment dispersant reacts with the multivalent metal ion eluted from the recording medium to be hydrophobized so as to be aggregated involving the pigment. Consequently, the penetration of the pigment into the paper is suppressed to allow a high image density to be obtained.

However, in PPC plain paper containing no water-soluble multivalent metal salt, the amount of the metal ion eluted from the recording medium is small, and the image density improvement effect due to the aggregation of the pigment is not obtained.

As a method for solving the foregoing problem, a method is possible which increases the proportion of the structural unit represented by the general formula (1) of the phosphate group-containing copolymer. However, it has been found that when the proportion of the structural unit represented by the general formula (1) is increased, probably because the interaction among the phosphate groups comes to be strong, the degradation of the dispersibility of the pigment or the thickening at the time of mixing of the pigment dispersion and a water-soluble solvent occurs. Accordingly, the constitutional proportion of the phosphate group-containing monomer in the copolymer using the conventional phosphate group-containing monomer has to be set at 20% by mass or less.

In the present invention, in addition to the structural unit represented by the general formula (1), by incorporating the structural unit represented by the structural formula (1) to be combined with the structural unit represented by the general formula (1), the following effects are obtained, and a high image density can be obtained even for general plain paper being low in the content of the water-soluble multivalent metal salt or containing only a sparingly soluble metal salt.

(i) The introduction of the structural unit represented by the structural formula (1) increases the affinity of the copolymer to water, and the thickening of the copolymer and the pigment dispersion comes to be hard to occur. Accordingly, it is possible to increase the introduction amount of the structural unit represented by the structural formula (1) and to increase the reactivity with metal ions.

(ii) The introduction of the structural unit represented by the structural formula (1) increases the affinity of the copolymer to a water-soluble organic solvent, allows the initial viscosity at the time of preparing an ink to be suppressed to be low, and additionally allows the storage stability of the ink to be improved.

<Phosphate Group-Containing Copolymer>

The phosphate group-copolymer copolymer includes the structural unit represented by the general formula (1) and the structural unit represented by the structural formula (1), and if necessary, other structural units.

The phosphate group-containing copolymer has a property such that when the inkjet recording ink impacts on a recording medium such as plain paper, the copolymer interacts with the multivalent metal ion (in particular, calcium ion) contained in the plain paper to be aggregated. This function suppresses the penetration of the ink into the paper so as to allow a high image density to be obtained.

In the present invention, the phosphate group-containing copolymer can be used as a pigment dispersant or an additive; in particular, by using as the pigment dispersant the phosphate group-containing copolymer, it is possible to provide an ink satisfactory in high image density and storage stability.

In the general formula (1), $R^1$ represents either of a hydrogen atom and a methyl group.

Examples of the alkali metal in the alkali metal ion of $M^+$ in the general formula (1) include lithium, sodium and potassium.

Examples of the organic amine in the organic amine ion of the $M^+$ include: alkylamines such as mono-, di- or trimethylamine and mono-, di- or triethyl amine; alcohol amines such as ethanolamine, diethanolamine, triethanolamine, methyl ethanolamine, methyldiethanolamine, dimethylethanolamine, monopropanolamine, dipropanolamine, tripropanolamine, isopropanol amine, tris(hydroxymethyl)aminomethane and 2-amino-2-ethyl-1,3-propanediol (AEPD); and cyclic amines such as choline, morpholine, N-methylmorpholine, N-methyl-2-pyrrolidone and 2-pyrrolidone.

Examples of the organic ammonium in the organic ammonium ion of the $M^+$ include organic ammoniums such as tetramethylammonium, tetraethylammonium and tetrabutylammonium.

Among these, dimethyl ethanolamine is preferable from the viewpoint of the improvement of the storage stability as ink.

As the $M^+$ one-half or more of the $M^+$ is an alkali metal ion, an organic ammonium ion or an organic amine, and the remainder is a hydrogen ion (proton) (the neutralization rate of the phosphate group-containing copolymer is preferably 50% or more); from the viewpoint of the dispersion stability and the storage stability of the pigment in the pigment dispersion, all of the $M^+$ (neutralization rate is 100%) is particularly preferably an alkali metal ion, an organic ammonium ion or an organic amine ion. When the neutralization rate is less than 50%, the dispersion condition of the pigment comes to be unstable, and consequently the initial viscosity of the pigment dispersion sometimes comes to be high or the storage stability of the pigment dispersion is sometimes decreased.

The neutralization rate can be derived from the ratio of the addition amount of the neutralizing agent to the placed amount of the structural unit represented by the general formula (1) (the monomer represented by the following general formula (2)) at the time of the synthesis of the phosphate group-containing copolymer.

The phosphate group-containing copolymer can include the structural units derived from the monomers other than the structural unit represented by the general formula (1) and the structural unit represented by the structural formula (1).

The other monomers are not particularly limited and can be appropriately selected according to the intended purpose; examples of the other monomers include polymerizable hydrophobic monomers and polymerizable hydrophilic monomers.

The polymerizable hydrophobic monomers are not particularly limited and can be appropriately selected according to the intended purpose. Examples of the polymerizable hydrophobic monomers include: unsaturated ethylene monomers having an aromatic ring such as styrene, α-methylstyrene, 4-t-butylstyrene and 4-chloromethylstyrene; alkyl (meth)acrylates such as methyl(meth)acrylate, ethyl(meth)acrylate, n-butyl(meth)acrylate, dimethyl maleate, dimethyl itaconate, dimethyl fumarate, lauryl(meth)acrylate (C12), tridecyl(meth)acrylate (C13), tetradecyl(meth)acrylate (C14), pentadecyl(meth)acrylate (C15), hexadecyl(meth) acrylate (C16), heptadecyl(meth)acrylate (C17), nanodecyl (meth)acrylate (C19), eicosyl(meth)acrylate (C20), heneicosyl(meth)acrylate (C21) and dococyl(meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nanodecene, 1-eicocene and 1-dococene. These may be used each alone or in combinations of two or more thereof.

The polymerizable hydrophilic monomers are not particularly limited and can be appropriately selected according to the intended purpose. Examples of the polymerizable hydrophilic monomers include: anionic unsaturated ethylene monomers such as (meth)acrylic acid or salts thereof maleic acid or salts thereof monomethyl maleate, itaconic acid, monomethyl itaconate, fumaric acid, 4-styrenesulfonic acid and 2-acrylamido-2-methylpropanesulfonic acid; and nonionic unsaturated ethylene monomers such as 2-hydroxyethyl (meth)acrylate, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol(meth)acrylamide, N-vinylformaide, N-vinylacetamide, N-vinylpyrrolidone, acrylamide, N,N-dimethylacrylamide, N-t-butylacrylamide, N-octylacrylamide and N-t-octylacrylamide. These may be used each alone or in combinations of two or more thereof.

The content of the constitutional unit represented by the general formula (1) in the phosphate group-containing copolymer is not particularly limited, and can be appropriately selected according to the intended purpose, but is preferably 10% by mass to 60% by mass and more preferably 15% by mass to 50% by mass in relation to the total mass of the copolymer. When the content is less than 10% by mass, the image density is sometimes decreased; when the content exceeds 60% by mass, the storage stability of the pigment dispersion and the storage stability of the ink are sometimes decreased.

The phosphate group-containing copolymer can be synthesized by polymerizing the monomer represented by the following general formula (2) and the monomer represented by the following structural formula (2), and if necessary, other monomers. Subsequently, the obtained copolymer is subjected to neutralization treatment with either of an alkali metal base and an organic amine base:

General formula (2)

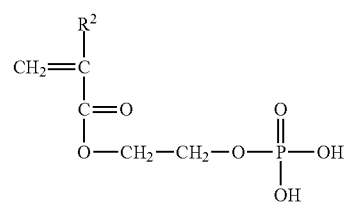

wherein, in the general formula (2), R² represents either of a hydrogen atom and a methyl group;

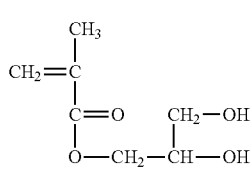

Structural formula (2)

Examples of the monomer represented by the general formula (2) include 2-methacryloyloxyethyl acid phosphate and 2-acryloyloxyethyl acid phosphate.

As foregoing 2-methacryloyloxyethyl acid phosphate, an appropriately synthesized compound may be used, or a commercial product may also be used. The commercial products come onto the market and are available, for example, under the product names of Light Ester P—IM manufactured by Kyoeisha Chemical Co., Ltd. and Phosmer M manufactured by Uni-Chemical Co., Ltd.

As foregoing 2-acryloyloxyethyl acid phosphate, an appropriately synthesized compound may be used, or a commercial product may also be used. The commercial product comes onto the market and is available, for example, under the product name of Light Acrylate P-1A manufactured by Kyoeisha Chemical Co., Ltd.

Examples of the monomer represented by the structural formula (2) include glycerin methacrylate. As foregoing glycerin methacrylate, an appropriately synthesized compound may be used, or a commercial product may also used. The commercial product comes onto the market, for example, under the product name of Blenmer GLM manufactured by NOF Corp. and hence is available.

The polymerization method of the phosphate group-containing copolymer used in the present invention is not particularly limited, and as the polymerization method, heretofore known various synthesis methods such as solution polymerization, suspension polymerization, bulk polymerization and emulsion polymerization can be utilized; however, from the viewpoint of easiness in polymerization operation and molecular weight regulation, a method using a radical polymerization initiator is preferable.

The radical polymerization initiator is not particularly limited, and generally used radical polymerization initiators can be used; specific examples of such an initiator include peroxy ketal, hydroperoxide, dialkyl peroxide, diacyl peroxide, peroxydicarbonate, peroxy ester, cyano-based azobisisobutyronitrile, azobis(2-methyl butyronitrile), azobis(2,2'-isovaleronitrile) and non-cyano-based dimethyl-2,2'-azobisisobutyrate.

Among these, organic peroxides and azo compounds easy in molecular weight control and low in decomposition temperature are preferable, and azo compounds are particularly preferable.

The used amount of the polymerization initiator is not particularly limited and can be appropriately selected according to the intended purpose, but is preferably 1% by mass to 10% by mass in relation to the total mass of the polymerizable monomers.

For the purpose of regulating the molecular weight of the phosphate group-containing copolymer, a chain transfer agent such as mercaptoacetic acid, mercaptopropionic acid, 2-propanethiol, 2-mercaptoethanol, thiophenol, dodecyl mercaptan, 1-dodecanethiol or thioglycerol may be added in an appropriate amount to the polymerization system.

The polymerization temperature is not particularly limited and can be appropriately selected according to the intended purpose, but is preferably 50° C. to 150° C. The polymerization time is not particularly limited and can be appropriately selected according to the intended purpose, but is preferably 3 hours to 48 hours.

The phosphate group-containing copolymer is synthesized from the monomer represented by the general formula (2) and the monomer represented by the structural formula (2) as starting materials. Other monomer components may be added to the phosphate group-containing copolymer.

The phosphate group-containing copolymer can be polymerized, for example, at normal temperature to 150° C. by placing a solvent, the monomer represented by the general formula (2) and the monomer represented by the structural formula (2), and by adding, if necessary, a polymerization initiator and a chain transfer agent, in a four-neck flask equipped with a thermometer, a stirrer and a nitrogen introduction tube.

The phosphate groups in the phosphate group-containing copolymer are partially or wholly subjected to neutralization treatment with a base. The neutralization treatment can also be performed under the condition such that the pigment and the copolymer are mixed with each other in the production of the ink.

As the base used in the neutralization treatment, for example, an alkali metal and an organic amine are quoted, and specific examples of the base are as described above.

The viscosity of a 10% by mass aqueous solution of the phosphate group-containing copolymer is not particularly limited, and can be appropriately selected according to the intended purpose, but is at 25° C. preferably 4.0 mPa·s to 30.0 mPa·s and more preferably 4.0 mPa·s to 20.0 mPa·s. When the viscosity is less than 4.0 mPa·s, the reactivity between the metal ion eluted from a recording medium such as plain paper and the pigment dispersant is degraded and the image density is sometimes decreased somewhat; when the viscosity exceeds 30.0 mPa·s, the dispersion stability of the pigment is degraded and the storage stability of the pigment dispersion is sometimes degraded somewhat.

The viscosity can be measured, for example, with a rotation viscometer (TV-22 viscometer, cone-plate type, manufactured by Toki Sangyo Co., Ltd).

The phosphate group-containing copolymer can be widely used in various fields, without being particularly limited, and can be suitably used as additives such as a chelating agent, a pigment concentration improving agent, a pigment binder resin and a viscosity regulator, and as a pigment dispersant.

The content of the phosphate group-containing copolymer in the inkjet recording ink when the phosphate group-containing copolymer is used as an additive is not particularly limited and can be appropriately selected according to the intended purpose, but is preferably 0.5% by mass to 10% by mass and more preferably 1% by mass to 5% by mass. The addition of the phosphate group-containing copolymer in a content of 0.5% by mass or more results in a definite improvement effect of the image density, and the addition of the phosphate group-containing copolymer in a content of 10% by mass or lees allows the viscosity of the ink to be suppressed so as to fall in a viscosity range suitable for the ejection of the ink from the head.

When the phosphate group-containing copolymer is used as a pigment dispersant, the image density on plain paper can be improved. Additionally, the storage stability of a rich ink having a content of the water-soluble solvent exceeding 20% by mass is found to be further improved.

The content of the phosphate group-containing copolymer used as a pigment dispersant in the inkjet recording ink is not particularly limited, and can be appropriately selected according to the intended purpose, but is preferably 1 part by mass to 100 parts by mass and more preferably 5 parts by mass to 80 parts by mass in relation to 100 parts by mass of the pigment. Within this range, the most suitable particle size of the pigment is obtained, and the image density, the dispersibility and the storage stability fall within satisfactory ranges, respectively. Alternatively, within a range not impairing the advantageous effects, a below-described dispersant may also be used in combination with the copolymer.

<Water>

The water is not particularly limited, and can be appropriately selected according to the intended purpose, and examples of the water include pure water and ultrapure water such as ion-exchanged water, ultrafiltered water, reverse osmotic water and distilled water.

The content of the water in the inkjet recording ink is not particularly limited, and can be appropriately selected according to the intended purpose, but is preferably 20% by mass to 60% by mass.

<Water-Soluble Solvent>

The water-soluble solvent has, for example, a function to improve the ejection stability by imparting moisture retaining effect.

The water-soluble solvent is not particularly limited, and can be appropriately selected according to the intended purpose. Examples of the water-soluble solvent include: polyhydric alcohols such as ethylene glycol, diethylene glycol 1,3-butanediol, 3-methyl-1,3-butyl glycol, triethylene glycol, polyethylene glycol, polypropylene glycol, 1,5-pentanediol, 1,6-hexanediol, glycerin, 1,2,6-hexanetriol, 2-ethyl-1,3-hexanediol, 2,2,4-trimethyl-1,3-pentanediol, 1,2,4-butanetriol, 1,2,3-butanetriol, petriol and trimethylolpropane; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glyol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl imidazolidinone, ε-caprolactam and γ-butyrolactone; amides such as formamide, N-methylformamide and N,N-dimethyl fromamide; amines such as monoethanolamine, diethanolamine and triethylamine; sulfur-containing compounds such as dimethyl sulfoxide, sulfolane and thiodiethanol; and propylene carbonate and ethylene carbonate.

These may be used each alone or in combinations of two or more thereof. Among these, from the viewpoint of preventing the ejection failure due to evaporation of moisture, 1,3-butanediol, 2-pyrrolidone, glycerin and trimethylolpropane are preferable.

The content of the water-soluble solvent in the inkjet recording ink is not particularly limited and can be appropriately selected according to the intended purpose, but is preferably 10% by mass to 50% by mass. When the content is less than 10% by mass, the ink tends to undergo moisture evaporation, and for example, the moisture evaporation of the ink sometimes causes ink clogging due to thickening of the ink in the ink feeding system in the inkjet recording apparatus. When the content exceeds 50% by mass, the ink clogging due to thickening of the ink is made to hardly occur in the inkjet recording apparatus however, it is sometimes necessary to reduce the solid content such as a pigment or a resin in order to make the ink have an intended viscosity, and thus the image density of the ink recorded matter is sometimes reduced.

<Pigment>

The pigment is not particularly limited and can be appropriately selected according to the intended purpose, and may be, for example, either of an inorganic pigment or an organic pigment. These may be used each alone or in combinations of two or more thereof.

Examples of the inorganic pigment include titanium oxide, iron oxide, calcium carbonate, barium sulfate, aluminum hydroxide, barium yellow, Prussian blue, cadmium red, chromium yellow, metal powders and carbon black. Among these, carbon black is preferable. Examples of the carbon black include carbon blacks produced by the heretofore known methods such as a contact method, a furnace method and a thermal method.

Examples of the organic pigment include am pigments, azomethine pigments, polycyclic pigments, dye chelates, nitro pigments, nitroso pigments and aniline black. Among these, for example, azo pigments and polycyclic pigments are preferable.

Examples of the am pigments include azo lakes, insoluble am pigments, condensed am pigments and chelate am pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, quinophthalone pigments and rhodamine B lake pigments. Examples of the dye chelates include basic dye chelates and acidic dye chelates.

Examples of the pigments for black color include: carbon black (C.I. Pigment Black 7) such as furnace black, lamp black, acetylene black or channel black carbon black; metals such as copper, iron (C.I. Pigment Black 11) and titanium oxide; and organic pigments such as aniline black (C.I. Pigment Black 1).

As the carbon black, preferable is a carbon black which is produced by the furnace method or the channel method, has a primary particle size of 15 nm to 40 nm, has a specific surface area based on the BET method of 50 $m^2$/g to 300 m/g, has a DBP oil absorption amount of 40 mL/100 g to 150 mL/100 g, has a volatile component content of 0.5% to 10%, and has a pH of 2 to 9.

As the carbon black, a commercial product can be used. Examples of the commercial product include: No. 2300, No. 900, MCF-88, No. 33, No. 40, No. 45, No. 52, MA7, MA8, MA100, No. 2200B (these are all manufactured by Mitsubishi Chemical Corp.); Raven 700, Raven 5750, Raven 5250, Raven 5000, Raven 3500, Raven 1255 (these are all manufactured by Columbian Chemicals Co.); Regal 400R, Regal 330R, Regal 660R, Mogul L, Monarch 700, Monarch 800, Monarch 880, Monarch 900, Monarch 1000, Monarch 1100, Monarch 1300, Monarch 1400 (these are all manufactured by Cabot Corp); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 and NIPEX 160 (these are all manufactured by Evonik Degussa GmbH).

The pigments usable for yellow inks of the foregoing pigments for color are not particularly limited, and can be appropriately selected according to the intended purpose. Examples of such pigments include: C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C. Pigment Yellow 120, CJ. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174 and C.I. Pigment Yellow 180.

The pigments usable for magenta inks of the foregoing pigments for color are not particularly limited, and can be appropriately selected according to the intended purpose. Examples of such pigments include: C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202 and C.I. Pigment Violet 19.

The pigments usable for cyan inks of the foregoing pigments for color are not particularly limited, and can be appropriately selected according to the intended purpose. Examples of such pigments include: C.I. Pigment Blue 1, C.I. Pigment Blue 2, C.I. Pigment Blue 3, C.I. Pigment Blue 15, C.I. Pigment Blue 15:3, C. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, C.I. Vat Blue 4 and C.I. Vat Blue 60.

As the pigments contained in the individual inks used in the present invention, even the pigments newly produced for the present invention can also be used.

The use of C.I. Pigment Yellow 74 as a yellow pigment, C.I. Pigment Red 122 and C.I. Pigment Violet 19 as magenta pigments and C.I. Pigment Blue 15:3 as a cyan pigment allows an ink excellent in color tone and lightfastness and satisfactory in balance to be obtained.

As the pigments used in the present invention, pigments subjected to a graft treatment or a capsulation treatment by coating the pigments with a surfactant such as a dispersant or a resin can also be used; however, the compound of the present invention is more preferably used as a dispersant.

Within a range not impairing the advantageous effects, the foregoing pigments may also be used in combinations.

The volume average particle size of the pigment is not particularly limited, and can be appropriately selected according to the intended purpose, but is preferably 150 nm or less.

The volume average particle size of the pigment can be measured by the dynamic light scattering method with the Microtrac UPA manufactured by Nikkiso Co., Ltd. in an environment of 23° C. and 55% RH.

The content of the pigment in the inkjet recording ink is not particularly limited and can be appropriately selected according to the intended purpose, but is preferably 0.1% by mass to 20% by mass.

As the pigment, a pigment dispersion is preferably used.

The pigment dispersion is obtained by mixing water, a pigment and a pigment dispersant, and if necessary, other components, and by subsequently dispersing the resulting mixture with a disperser to regulate the particle size.

As the pigment dispersant, the phosphate group-containing copolymer of the present invention is preferably used; however, examples of other usable dispersants include: various surfactants such as anionic surfactants, cationic surfactants, amphoteric surfactants, nonionic surfactants; sodium naphthalenesulfonate formalin condensate, and polymer-type dispersants. These may be used each alone or in combinations of two or more thereof.

Examples of the anionic surfactants include: alkylsulfocarboxylic acid salt, α-olefin sulfonic acid salt, polyoxyethylene alkyl ether acetic acid salt, N-acylamino acids and the salts thereof, N-acylmethyl tauric acid salt, polyoxyalkyl ether sulfuric acid salt, polyoxyethylene alkyl ether phosphoric acid salt, rosin acid soap, castor-oil sulfuric acid ester salt, lauryl alcohol sulfuric acid ester salt, alkylphenol type phosphoric acid ester, naphthalenesulfonic acid salt formalin condensate, alkyl type phosphoric acid ester, alkyl allyl sulfuric acid salt, diethylsulfosuccinic acid salt, diethylhexylsulfosuccinic acid salt and dioctylsulfosuccinic acid salt.

Examples of the cationic surfactants include 2-vinylpyridine derivatives and poly-4-vinylpyridine derivatives.

Examples of the amphoteric surfactants include lauryldimethylaminoacetic acid betaine, 2-alkyl-N-carboxymethyl-N-hydroxyethylimidazolinium betaine, palm oil fatty acid propyldimethylaminoacetic acid betaine, polyoctylpolyaminoethylglycine and imidazoline derivatives.

Examples of the nonionic surfactants include: ether-based surfactants such as polyoxyethylene nonyl phenyl ether, polyoxyethylene octyl phenyl ether, polyoxyethylene dodecyl phenyl ether, polyoxyethylene lauryl ether, polyoxyethylene oleyl ether, polyoxyethylene alkyl ether and polyoxy aralkyl alkyl ether; ester-based surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate and polyoxyethylene stearate; and acetylene glycol-based surfactants such as 2,4,7,9-tetramethyl-5-decyne-4,7-diol, 3,6-dimethyl-4-octyl-3,6-diol and 3,5-dimethyl-1-hexyne-3-ol.

The content of the pigment at the time of the preparation of the pigment dispersion is not particularly limited, and can be appropriately selected according to the intended purpose, but is preferably 0.1% by mass to 50% by mass and more preferably 0.1% by mass to 30% by mass.

The obtained pigment dispersion is preferably, if necessary, subjected to filtration of coarse particles with, for example, a filter or a centrifugal separator, and subjected to deaeration.

<Other Components>

The other components are not particularly limited, and can be appropriately selected according to the intended purpose; however, examples of the other components include a penetrating agent, a pH adjuster, a water dispersible resin, a preservative and fungicide, a chelating agent, an anti-rust agent, an antioxidant, an ultraviolet absorber, an oxygen absorber and a light stabilizer.

—Penetrating Agent—

The penetrating agent preferably includes either of a polyol compound having 8 to 11 carbon atoms and a glycol ether compound having 8 to 11 carbon atoms.

The penetrating agent is different from the wetting agent, and relatively lower in wettability than the wetting agent, and hence can be referred to as a "non-wetting agent type medium." The non-wetting agent-type penetrating agent preferably has a solubility of 0.2% by mass to 5.0% by mass in water at 25° C.

Among these, 2-ethyl-1,3-hexanediol [solubility: 4.2% by mass (25° C.)] and 2,2,4-trimethyl-1,3-pentane diol [solubility: 2.0% by mass (25° C.)] are particularly preferable.

Examples of the other polyol compounds include: aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentane diol, 2,5-dimethyl-2,5-hexane diol and 5-hexane-1,2-diol.

The other penetrating agents usable in combination are not particularly limited and can be appropriately selected according to the intended purpose as long as the other penetrating agents are soluble in ink and allow the properties of the ink to be regulated to meet the intended properties; examples of the other penetrating agents include: alkyl and aryl ethers of polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether and tetraethylene glycol chorophenyl ether; and lower alcohols such as ethanols.

The content of the penetrating agent in the inkjet recording ink is not particularly limited, and can be appropriately selected according to the intended purpose, but is preferably 0.1% by mass to 4% by mass. When the content is less than 0.1% by mass, no quick drying property is sometimes obtained to result in blurred images, and when the content exceeds 4% by mass, the dispersion stability of the pigment is sometimes impaired to cause the nozzle to tend to undergo clogging, the penetrability into the media for recording (recording media) sometimes comes to be higher than necessary, or the decrease of the image density or the strike through is sometimes caused to occur.

—pH Adjuster—

The pH adjuster is not particularly limited and can be appropriately selected according to the intended purpose as long as the pH adjuster can adjust the pH of the inkjet recording ink so as to fall within a range from 8.5 to 11 and preferably from 9 to 11 without adversely affecting the inkjet recording ink to be prepared; however, examples of the pH adjuster include alcoholamines, hydroxides of alkali metal elements, hydroxides of ammonium, phosphonium hydroxides and carbonates of alkali metals. When the pH is less than 8.5 and exceeds 11, the dissolution amount of the inkjet head or the ink feeding unit sometimes comes to be large to cause failures such as the quality change or leakage of the ink, or the ejection failure. When the pH is less than 8.5, the pH of the ink is sometimes decreased during the storage of the ink to cause the aggregation of the polymer fine particles due to the increase of the particle size.

The pH can be measured, for example, with a pH meter (HM-30R, manufactured by DKK-TOA Corp.).

Examples of the alcoholamines include diethanolamine, triethanolamine and 2-amino-2-ethyl-1,3-propanediol. Examples of the hydroxides of alkali metal elements include lithium hydroxide, sodium hydroxide and potassium hydroxide. Examples of the hydroxides of ammonium include ammonium hydroxide, quaternary ammonium hydroxide and quaternary phosphonium hydroxide. Examples of the carbonates of alkali metals include lithium carbonate, sodium carbonate and potassium carbonate.

—Water-Dispersible Resin—

The water-dispersible resin is excellent in film formability (image formability), is provided with high water repellency, high water resistance and high weather resistance, and is useful for recording of images having high water resistance and high image density (high color developing property).

Specific examples of the water-dispersible resin include condensed synthetic resins, addition synthetic resins and natural polymer compounds.

Examples of the condensed synthetic resins include polyester resins, polyurethane resins, polyepoxy resins, polyamide resins, polyether resins, poly(meth)acrylic resins, acrylic-silicone resins and fluorine-based resins. Examples of the addition synthetic resins include polyolefin resins, polystyrene-based resins, polyvinyl alcohol-based resins, polyvinyl ester-based resins, polyacrylic acid-based resins and unsaturated carboxylic acid-based resins. Examples of the natural polymer compounds include celluloses, rosins and natural rubbers.

Among these, polyurethane resin fine particles, acrylic-silicone resin fine particles and fluorine-based resins fine particles are preferable.

The volume average particle size of the water-dispersible resin is related with the viscosity of the dispersion, and in the case of the dispersions having the same compositions, the smaller the particle size, the higher the viscosity for the same solid content. In order to prevent the ink from being excessively high in viscosity, the volume average particle size of the water-dispersible resin is preferably 50 nm or more. If the particle size comes to be a few tens microns, such size is larger than the nozzle opening of the inkjet head, and hence it is impossible to use the water-dispersible resin having such a particle size. Even if the particle size is smaller than the nozzle opening, the presence of the particles having larger particle sizes degrades the ejection stability of the ink. Accordingly, in order not to inhibit the ink ejection stability, the volume average particle size is more preferably 200 nm or less.

Here, the volume average particle size of the water-dispersible resin is the value measured by the dynamic light scattering method with the Microtrac UPA manufactured by Nikkiso Co., Ltd. in an environment of 23° C. and 55% RH.

The water-dispersible resin preferably has a function to fix the water dispersed pigment on the paper surface and to allow the water dispersed pigment to form a coating film at normal temperature so as to improve the fixability of the pigment. For that purpose, the minimum film formation temperature (MFT) of the water-dispersible resin is preferably 30° C. or lower.

When the glass transition temperature of the water-dispersible resin is −40° C. or lower, the viscosity of the resin coating film comes to be strong to cause tack on printed materials, and hence the water-dispersible resin is preferably a water-dispersible resin having a glass transition temperature of −30° C. or higher.

The content of the water-dispersible resin in the inkjet recording ink is not particularly limited, and can be appropriately selected according to the intended purpose, but is preferably 1% by mass to 15% by mass and more preferably 2% by mass to 7% by mass.

—Preservative and Fungicide—

Examples of the preservative and fungicide include sodium dehydroacetate, sodium sorbate, sodium 2-pyridinethiol-1-oxide, sodium benzoate and sodium pentachorophenolate.

—Chelating Agent—

Examples of the chelating agent include sodium ethylenediaminetetraaetate, sodium nitrilotriacetate, sodium hydroxyethyl ethylenediaminetriacetate, sodium diethylenetriaminepentaacetate and sodium uramildiacetate.

—Anti-Rust Agent—

Examples of the anti-rust agent include acid sulfite, sodium thiosulfate, ammonium thiodiglycolate, diisopropylammonium nitrite, pentaerythritol tetranitrate and dicyclohexylammonium nitrite.

—Antioxidant—

Examples of the antioxidant include phenolic antioxidants (inclusive of hindered phenolic antioxidants), amine-based antioxidants, sulfur-based antioxidants and phosphorus-based antioxidants.

—Ultraviolet Absorber—

Examples of the ultraviolet absorber include benzophenone-based ultraviolet absorbers, benatriazole-based ultraviolet absorbers, salicylate-based ultraviolet absorbers, cyanoacrylate-based ultraviolet absorbers and nickel complex-based ultraviolet absorbers.

<Method for Producing Inkjet Recording Ink>

The inkjet recording ink can be produced by dispersing or dissolving water, a water-soluble solvent, a pigment and a phosphate group-containing copolymer, and if necessary, other components in an aqueous medium, and if necessary, by stirring and mixing the resulting mixture.

The dispersion operation can be performed with, for example, a sand mill, a homogenizer, a ball mill, a paint shaker or an ultrasonic disperser, and the stirring and mixing can be performed with a common stirrer using a stirring blade, a magnetic stirrer or a high speed disperser.

The viscosity of the inkjet recording ink of the present invention at 25° C. is not particularly limited, and can be appropriately selected according to the intended purpose, but is preferably 3 mPa·s to 20 mPa·s. The viscosity at 3 mPa·s or more results in the effects to improve the printing density or the letter quality. On the other hand, the viscosity suppressed at 20 mPa·s or less allows the ejection performance to be ensured.

The viscosity can be measured by using, for example, a viscometer (RL-5560, manufactured by Toki Sangyo Co., Ltd.) at 25° C.

The surface tension of the inkjet recording ink is not particularly limited, and can be appropriately selected according to the intended purpose, but is 40 mN/m or less at 25° C. When the surface tension exceeds 40 mN/m, the leveling of the ink on the medium for recording sometimes hardly occurs to elongate the drying time.

(Ink Cartridge)

The ink cartridge of the present invention is a cartridge for housing in a vessel the inkjet recording ink of the present invention, and includes other members, if necessary, appropriately selected.

The vessel is not particularly limited with respect to the shape, structure, size and material quality, and can be appropriately selected according to the intended purpose; suitable examples of the vessel include a vessel having an ink bag formed with an aluminum laminate film or a resin film.

Figure 2:
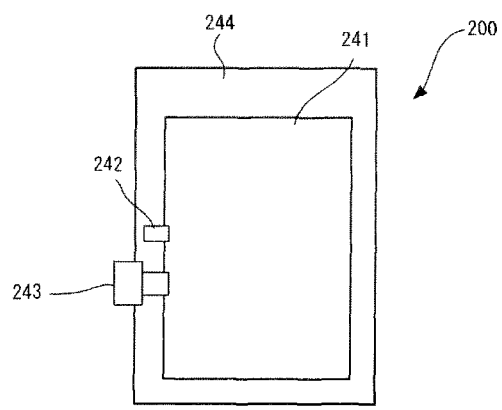
FIG. 2 is a schematic view illustrating the ink cartridge of FIG. 1 inclusive of the case thereof.

An aspect of the ink cartridge of the present invention is described with reference to FIG. 1 and FIG. 2. FIG. 1 is a schematic plan view illustrating an example of the ink cartridge of the present invention. FIG. 2 is a schematic plan view of the ink cartridge of FIG. 1 inclusive of the case (exterior member) thereof.

As shown in FIG. 1, in the ink cartridge 200, ink is filled from an ink inlet 242 into an ink bag 241 and evacuated, and then the ink inlet 242 is fused to be closed. At the time of use, an ink outlet 243 made of a rubber member is pierced with a needle of the apparatus body to allow the ink to be fed to the apparatus. The ink bag 241 is formed of a packaging member such as an aluminum laminate film having no air permeability. As shown in FIG. 2, the ink bag 241 is usually housed in a cartridge case 244 made of a plastic, and is designed to be used as mounted in various inkjet recording apparatuses in a detachable manner.

(Ink Jet Recording Apparatus and Ink Jet Recording Method)

The inkjet recording apparatus of the present invention includes at least an ink flying unit, and additionally, if necessary, appropriately selected other units such as a stimulus generating unit and a control unit.

The inkjet recording method of the present invention includes at least an ink flying step, and additionally, if necessary, appropriately selected other steps such as a stimulus generating step and a control step.

The inkjet recording method of the present invention can be suitably implemented with the inkjet recording apparatus of the present invention, and the ink flying step can be suitably performed with the ink flying unit. The other steps can be performed with the other units.

<Ink Flying Step and Ink Flying Unit>

The ink flying step is a step of forming an image by applying a stimulus to the inkjet recording ink of the present invention to allow the inkjet recording ink to fly.

The ink flying unit is a unit for forming an image by applying a stimulus to the inkjet recording ink of the present invention to allow the inkjet recording ink to fly. The ink flying unit is not particularly limited, and can be appropriately selected according to the intended purpose, and examples of such a unit include various nozzles for ink ejection.

The stimulus can be generated with, for example, the stimulus generating unit, and the stimulus is not particularly limited and can be appropriately selected according to the intended purpose; examples of such a stimulus include heat (temperature), pressure, vibration and light. These may be used each alone or in combinations of two or more thereof. Among these, heat and pressure are suitably quoted.

Examples of the stimulus generating unit include a heating device, a pressurizing device, a piezoelectric element, a vibration generator, an ultrasonic oscillator and a light source. Specific examples of the stimulus generating unit include: a piezoelectric actuator such as a piezoelectric element; a thermal actuator utilizing the phase change due to the film boiling of a liquid by using an electrothermal conversion element such as a heating resistor; a shape memory alloy actuator using the metal phase change due to temperature change; and an electrostatic actuator using electrostatic force.

The aspect of the ink flying is not particularly limited, and is varied depending on the factors such as the types of the foregoing stimuli; when the stimulus is "heat," examples of such an aspect include a method in which a thermal energy corresponding to a recording signal is imparted to the ink in a recording head by using, for example, a thermal head, a bubble is generated in the ink by the thermal energy, and the ink is ejected and jetted as a droplet from the nozzle hole of the recording head. Alternatively, when the stimulus is "pressure," examples of such an aspect include a method in which a voltage is applied to a piezoelectric element made to adhere to a position denoted as a pressure chamber in the ink flow path in a recording head, thus the piezoelectric element is bent to reduce the volume of the pressure chamber, and consequently the ink is ejected and jetted as a droplet from the nozzle hole of the recording head.

The control unit is not particularly limited as long as the control unit can control the operations of the foregoing individual units, and can be appropriately selected according to the intended purpose; examples of such a control unit include devices such as a sequencer and a computer.

Herein, an aspect of implementing the inkjet recording method of the present invention with the inkjet recording apparatus of the present invention is described with reference to drawings.

Figure 3:
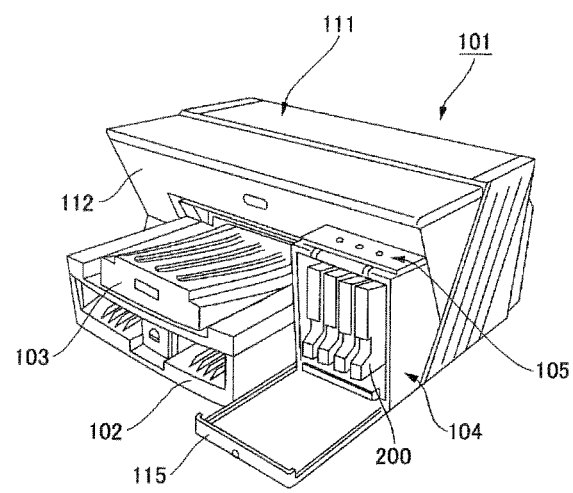
FIG. 3 is an oblique perspective view illustrating an example of an inkjet recording apparatus.

FIG. 3 is an oblique perspective view illustrating an example of the serial type inkjet recording apparatus of the present invention.

The inkjet recording apparatus shown in FIG. 3 includes an apparatus body 101, a paper feeding tray 102, mounted in the apparatus body 101 for loading sheets of paper, a paper discharge tray 103 mounted in the apparatus body 101 for stocking the sheets of paper having the images recorded (formed) thereon, and an ink cartridge mounting unit 104, on one end side of the front side 112 of the apparatus body 101, projecting forward from the front side 112 and being disposed to be lower than a frame top cover 111. On the top face of the ink cartridge mounting unit 104, an operation unit (panel) 105 including, for example, operation keys and indicators is disposed. The ink cartridge mounting unit 104 has a front cover 115, capable of being opened and closed, for attaching and detaching the ink cartridges 200.

Figure 4:
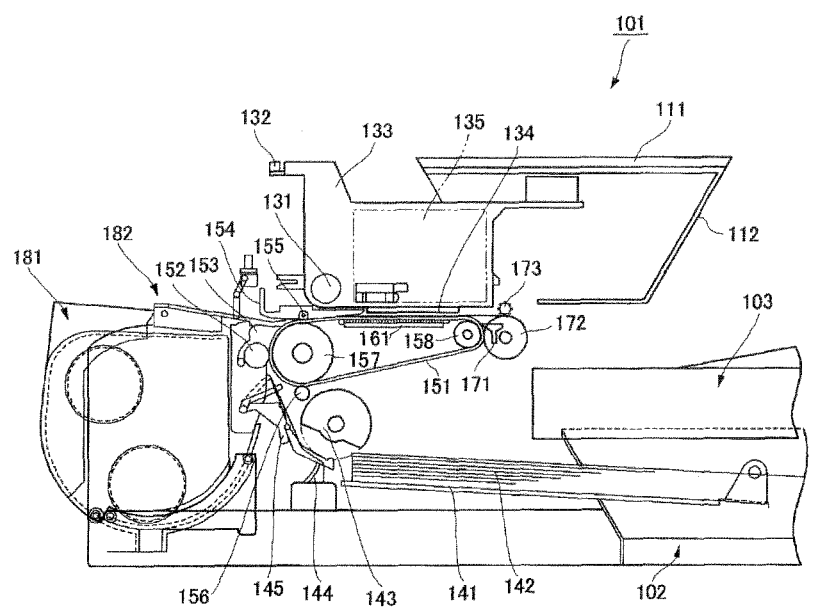
FIG. 4 is a view illustrating an example of an inkjet recording apparatus.
Figure 5:
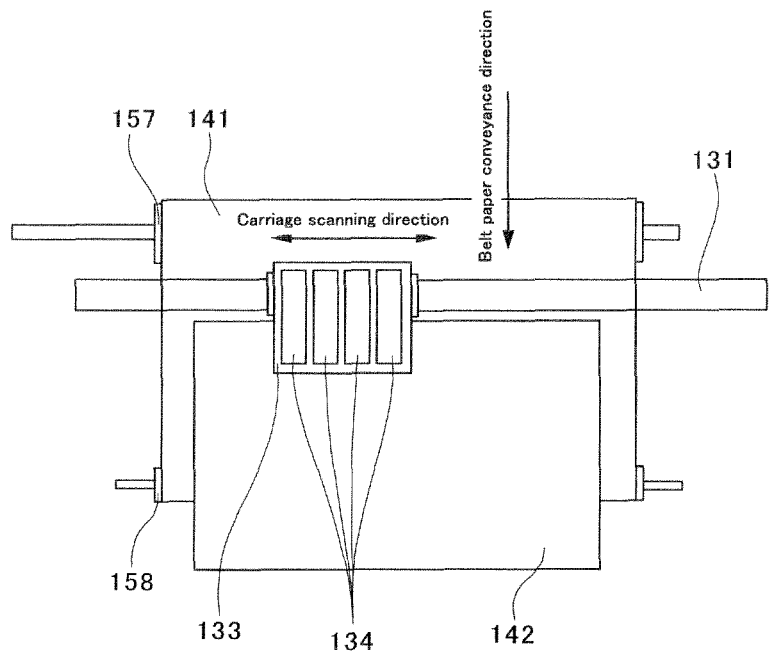
FIG. 5 is a schematic enlarged view illustrating an example of the inkjet head of an inkjet recording apparatus.

In the apparatus body 101, as shown in FIG. 4 and FIG. 5 (a partially enlarged cross-sectional view in the inkjet recording apparatus shown in FIG. 3), a carriage 133 is held freely slidably in the main-scanning direction by a guide rod 131 and a stay 132, which are the members laid across laterally between the right and left side plates omitted in the figure, and the carriage 133 is moved for scanning in the direction indicated by the arrows as shown in FIG. 5 by a main canning motor.

In the carriage 133, recording heads 134, including four inkjet recording heads ejecting ink droplets of yellow (Y), cyan (C), magenta (M) and black (Bk) colors respectively, are arranged in such a way that a plurality of ink ejection openings lie in the direction crossing with the main-scanning direction, and the recording heads 134 are mounted in such a way that the ink droplet ejection direction lies in the downward direction.

As the inkjet recording heads constituting the recording heads 134, inkjet recording heads can be used which are provided with, as units generating energy to eject the ink, for example, a piezoelectric actuator such as a piezoelectric element, a thermal actuator utilizing the phase change due to the film boiling of a liquid by using an electrothermal conversion element such as a heating resistor; a shape memory alloy actuator using the metal phase change due to temperature change; or an electrostatic actuator using electrostatic force. In the carriage 133, subtanks 135 of individual colors for feeding individual color inks to the recording heads 134 are mounted. To the subtanks 135, the inks are fed and replenished through the intermediary of the not-shown ink feed tubes, from the ink cartridges 200 of the present invention mounted in the ink cartridge mounting unit 104.

On the other hand, as the paper feeding unit for paper feeding the sheets of paper 142 stacked in the sheets of paper stacking unit (pressure plate) 141 of the paper feeding tray 103, provided are a semicircular roller (paper feeding roller 143), for feeding one sheet by one sheet separately sheets of paper 142 from the sheets of paper stacking unit 141 and the separation pad 144 facing the paper feeding roller 143 and being made of a material having a large coefficient of friction, wherein the separation pad 144 is pressed against the paper feeding roller 143. As the conveying unit for conveying the sheets of paper 142 fed from the paper feeding unit, beneath the recording heads 134, provided are a conveyance belt 151 for electrostatically adsorbing and conveying the sheets of paper 142, the counter roller 152 for conveying the sheets of paper 142 conveyed from the paper feeding unit through the intermediary of a guide 145 by sandwiching the sheets of paper 142 between the counter roller 152 and the conveyance belt 151, a conveyance guide 153 for guiding the sheets of paper 142, conveyed substantially vertically, through a direction change of about 90°, on and along the conveyance belt 151, and a tip pressure roller 155 pressed against the conveyance belt 151 with the aid of a pressing member 154.

A charging roller 156, the charging unit for charging the surface of the conveyance belt 151, is also provided. The conveyance belt 151 is an endless belt, and is laid across in a tensioned condition between a conveyance roller 157 and a tension roller 158 so as to be circumferentially movable in the belt conveyance direction. The conveyance belt 151 has, for example, a surface layer to be a paper sheet adsorbing surface, made of a resin material, not controlled in resistance, such as a copolymer between tetrafluoroethylene and ethylene (ETFE) of about 40 μm in thickness, and a back layer (medium resistance layer, ground layer) made of the same material as the material of the surface layer and controlled in resistance with carbon. On the back side of the conveyance belt 151, a guide member 161 is disposed so as to be parallel to the printing area based on the recording heads 134.

As the paper discharge unit for discharging the sheets of paper 142 recorded with the recording heads 134, provided are a separation claw 171 for separating the sheets of paper 142 from the conveyance belt 151, a paper discharge roller 172 and a paper discharge roller 173, wherein a paper discharge tray 103 is disposed beneath the paper discharge roller 172.

On the back side of the apparatus body 101, a double-side paper feeding unit 181 is mounted in a freely detachable manner.

The double-side paper feeding unit 181 takes in the sheets of paper 142 returned by the reverse direction rotation of the conveyance belt 151, inverts the sheets of paper 142 and again feeds the sheets of paper 142 to between the counter roller 152 and the conveyance belt 151. On the top face of the double-side paper feeding unit 181, a manual paper feeding unit 182 is provided.

In the inkjet recording apparatus, the sheets of paper 142 are fed one sheet by one sheet separately from the paper feeding unit, and the sheets of paper 142 fed substantially vertically are guided by the guide 145, and conveyed in a manner sandwiched between the conveyance belt 151 and the counter roller 152. The tips of the sheets of paper 142 are guided by the conveyance guide 153 and are pressed against the conveyance belt 151 by the tip pressure roller 155, and the conveyance direction is changed by approximately 90°. In this case, the conveyance belt 151 is charged by the charging roller 156, and the sheets of paper 142 are conveyed in a manner electrostatically adsorbed onto the conveyance belt 151. In this case, by driving the recording heads 134 according to the image signal while the carriage 133 is being moved, ink droplets are ejected onto a standing sheet of paper 142 to record a line of printing, then the sheet of paper 142 is conveyed in a predetermined distance, and then the recording of the next line is performed.

When a recording termination signal or a signal indicating the arrival of the tail end of a sheet of paper 142 in the recording area signal is received, the recording operation is terminated and the sheet of paper 142 is discharged to the paper discharge tray 103. And, when the near end of the residual quantity of the ink in the subtank 135 is detected, the required amount of the ink is supplied from the ink cartridge 200 to the subtank 135.

In the inkjet recording apparatus, when the ink in the ink cartridge 201 of the present invention is used up, the enclosure in the ink cartridge 200 is disassemble and only the internal ink bag can be exchanged. Even a constitution in which the ink cartridge 200 is vertically disposed on the front side of the inkjet recording apparatus allows stable supply of the ink. Accordingly, even in a case where the inkjet recording apparatus is placed in such a way the top side of the apparatus body 101 is blocked, such as a case where the inkjet recording apparatus is placed in a rack, or a case where an object is placed on the top face of the apparatus body 101, the exchange of the ink cartridge 200 can be easily performed.

The foregoing description is based on an example in which the present invention is applied to a serial type (shuttle type) inkjet recording apparatus allowing a carriage to scan; however, the present invention can also be applied to a line-type inkjet recording apparatus provided with a line-type head.

The inkjet recording apparatus of the present invention can be applied to various types of recoding apparatuses based on the inkjet recording method, and for example, particularly suitably applied to inkjet recording printers, facsimile machines, copiers, and printer/fax/copier multifunction peripherals.

(Ink Recorded Matter)

The ink recorded matter of the present invention includes an image recorded with the inkjet recording ink of the present invention on a recording medium.

The recording medium is not particularly limited, and can be appropriately selected according to the intended purpose; however, examples of the recording medium include plain paper, coated printing paper, glossy paper, special paper, cloth, film and OHP sheet. These may be used each alone or in combinations of two or more thereof. Among these, at least either of plain paper and coated printing paper is preferable. The plain paper is advantageous because of being inexpensive. The coated printing paper is more advantageous as compared to glossy paper because of being relatively inexpensive and giving smooth glossy images. However, the plain paper and the coated printing paper are poor in drying property and generally find difficulty in use for ink-jet printing, but the inkjet recording ink of the present invention is improved in drying property to allow the plain paper and the coated printing paper to be used.

The ink recorded matter of the present invention are high in image quality and free from blur and excellent in temporal stability, and can be suitably used for various purposes as various printed and image recording materials.

EXAMPLES

Hereinafter, Examples of the present invention are described, but the present invention is not limited to these Examples at all.

The viscosity of the copolymer in each of the synthesis examples was measured by the following method. The neutralization rate of each of the copolymers was derived as follows.

<Measurement of Viscosity of Copolymer>

The measurement of the viscosity of a 10% by mass aqueous solution of each of the synthesized copolymers was performed with a rotation viscometer (TV-22 viscometer, cone-plate type, manufactured by Toldki Sangyo Co., Ltd.). Specific operations are shown below. A copolymer was sampled in an amount of 1.1 mL and placed in a sample cup of the viscometer. At 25° C., the sample cup was mounted in the viscometer body and was allowed to stand still for 1 minute, and then the rotor of the viscometer was rotated, and the value after an elapsed time of 1 minute was read.

<Neutralization Rate of Copolymer>

The neutralization rate of each of the copolymers was derived from the ratio of the addition amount of the neutralizing agent to the placed amount of the phosphate group-containing monomer at the time of the synthesis of the copolymer. Specifically, the neutralization rate of Synthesis Example 2 (copolymer 2) was derived as follows.

<<Calculation of Neutralization Rate in Synthesis Example 2 (Copolymer 2)>>

In Synthesis Example 2, for preparing the copolymer, 3.0 g of Phoesmer M (2-methacryloyloxyethyl acid phosphate, manufactured by Uni-Chemical Co., Ltd.) was placed. The molecular weight of Phoesmer M is 210.1 g/mol, and hence the number of moles of 3.0 g of Phosmer M is 3.0 g/210.1 g/mol=$1.4 \times 10^{-2}$ mol.

In the copolymer, the same number of the phosphate groups as the number of molecules of Phosmer M, the amount of KOH required to neutralize 1 mole of the phosphate group is 2 moles, and hence the number of moles of KOH required for neutralizing 50% of the phosphate group in the copolymer is $1.4 \times 10^{-2}$ mol$\times 2 \times 50\% = 1.4 \times 10^{-2}$ mol.

The $1.4 \times 10^{-2}$ mol of KOH is $7.9 \times 10^{-1}$ g, and hence by placing $7.9 \times 10^{-1}$ g of KOH (practically, 15.8 g of a 5.0% by mass KOH aqueous solution) at the time of the preparation of the copolymer aqueous solution, a neutralization rate of 50% is achieved.

Synthesis Example 1

Synthesis of Copolymer 1

In a four-neck flask, 3.0 g of 2-methacryloyloxyethyl acid phosphate (Phosmer M, manufactured by Uni-Chemical Co., Ltd.), 17.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 75° C., and the solution was allowed to undergo polymerization reaction for 3 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 1 in which 100% of the phosphate group was neutralized was synthesized. The viscosity of a 10% by mass aqueous solution of the obtained copolymer 1 was found to be 3.8 mPa·s at 25° C.

Synthesis Example 2

Synthesis of Copolymer 2

In a four-neck flask, 3.0 g of a 2-methacryloyloxyethyl acid phosphate (Phosmer M, manufactured by Uni-Chemical Co., Ltd.), 17.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 50% acid neutralization, the mixture was purified with a dialysis membrane for 3 days, and the concentration of the mixture was regulated with water so as for the solid content concentration of the mixture to be 10% by mass.

In this way, the copolymer 2 in which 50% of the phosphate group was neutralized was synthesized. The viscosity of a 10% by mass aqueous solution of the obtained copolymer 2 was found to be 4.5 mPa·s at 25° C.

Synthesis Example 3

Synthesis of Copolymer 3

In a four-neck flask, 1.0 g of 2-methacryloyloxyethyl acid phosphate (Phosmer M, manufactured by Uni-Chemical Co., Ltd.), 19.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 3 in which 100% of the phosphate group was neutralized was synthesized. The viscosity of a 10% by mass aqueous solution of the obtained copolymer 3 was found to be 4.1 mPa·s at 25° C.

Synthesis Example 4

Synthesis of Copolymer 4

In a four-neck flask, 3.0 g of 2-methacryloyloxyethyl acid phosphate (Phosmer M, manufactured by Uni-Chemical Co., Ltd.), 17.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 4 in which 100% of the phosphate group was neutralized was synthesized. The viscosity of a 10% by mass aqueous solution of the obtained copolymer 4 was found to be 4.3 mPa·s at 25° C.

Synthesis Example 5

Synthesis of Copolymer 5

In a four-neck flask, 2.8 g of 2-acryloyloxyethyl acid phosphate (Light Acrylate P-1A, manufactured by Kyoeisha Chemical Co., Ltd.), 17.2 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 5 in which 100% of the phosphate group was neutralized was synthesized. The viscosity of a 10% by mass aqueous solution of the obtained copolymer 5 was found to be 4.2 mPa·s at 25° C.

Synthesis Example 6

Synthesis of Copolymer 6

In a four-neck flask, 11.0 g of 2-methacryloyloxyethyl acid phosphate (Phosmer M, manufactured by Uni-Chemical Co., Ltd.), 9.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 75° C., and the solution was allowed to undergo polymerization reaction for 3 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 6 in which 100% of the phosphate group was neutralized was synthesized. The viscosity of a 10% by mass aqueous solution of the obtained copolymer 6 was found to be 3.8 mPa·s at 25° C.

Synthesis Example 7

Synthesis of Copolymer 7

In a four-neck flask, 13.0 g of 2-methacryloyloxyethyl acid phosphate (Phosmer M, manufactured by Uni-Chemical Co., Ltd.), 7.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 7 in which 100% of the phosphate group was neutralized was synthesized. The viscosity of a 10% by mass aqueous solution of the obtained copolymer 7 was found to be 4.2 mPa·s at 25° C.

Synthesis Example 8

Synthesis of Copolymer 8

In a four-neck flask, 11.0 g of 2-methacryloyloxyethyl acid phosphate (Phosmer M, manufactured by Uni-Chemical Co., Ltd.), 9.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 66° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 8 in which 100% of the phosphate group was neutralized was synthesized. The viscosity of a 10% by mass aqueous solution of the obtained copolymer 8 was found to be 4.2 mPa·s at 25° C.

Synthesis Example 9

Synthesis of Copolymer 9

In a four-neck flask, 11.0 g of 2-methacryloyloxyethyl acid phosphate (Phosmer M, manufactured by Uni-Chemical Co., Ltd.), 9.0 g of glycerin methacrylate (Blenmer GLM, manufactured by NOF Corp), and 113.0 g of ethanol were placed and stirred to prepare a uniform solution. After nitrogen was blown into the solution for 30 minutes. 1.33 g of azobisisobutyronitrile was added to the solution at 50° C., and the solution was allowed to undergo polymerization reaction for 48 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 9 in which 100% of the phosphate group was neutralized was synthesized. The viscosity of a 10% by mass aqueous solution of the obtained copolymer 9 was found to be 31.1 mPa·s at 25° C.

Synthesis Example 10

Synthesis of Copolymer 10

In a four-neck flask, 13.0 g of 2-methacryloyloxyethyl acid phosphate (Phosmer M, manufactured by Uni-Chemical Co., Ltd.), 7.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 50° C., and the solution was allowed to undergo polymerization reaction for 24 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 10 in which 100% of the phosphate group was neutralized was synthesized. The viscosity of a 10% by mass aqueous solution of the obtained copolymer 10 was found to be 28.3 mPa·s at 25° C.

Synthesis Example 11

Synthesis of Copolymer 11

In a four-neck flask, 11.0 g of 2-methacryloyloxyethyl acid phosphate (Phosmer M, manufactured by Uni-Chemical Co., Ltd.), 9.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 50° C., and the solution was allowed to undergo polymerization reaction for 24 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 11 in which 100% of the phosphate group was neutralized was synthesized. The viscosity of a 10% by mass aqueous solution of the obtained copolymer 11 was found to be 29.0 mPa·s at 25° C.

Synthesis Example 12

Synthesis of Copolymer 12

In a bur-neck flask, 3.0 g of 2-methacryloyloxyethyl acid phosphate (Phosmer M, manufactured by Uni-Chemical Co., Ltd.), 17.0 g of glycerin methacrylate (Blenmer GLM, manufactured by NOF Corp), and 113.0 g of ethanol were placed and stirred to prepare a uniform solution. After nitrogen was blown into the solution for 30 minutes, 1.33 g of azobisisobutyronitrile was added to the solution at 50° C., and the solution was allowed to undergo polymerization reaction for 48 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 12 in which 100% of the phosphate group was neutralized was synthesized. The viscosity of a 10% by mass aqueous solution of the obtained copolymer 12 was found to be 30.5 mPa·s at 25° C.

Synthesis Example 13

Synthesis of Copolymer 13

In a four-neck flask, 1.0 g of 2-methacryloyloxyethyl acid phosphate (Phosmer M, manufactured by Uni-Chemical Co., Ltd.), 19.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 50° C., and the solution was allowed to undergo polymerization reaction for 24 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 13 in which 100% of the phosphate group was neutralized was synthesized. The viscosity of a 10% by mass aqueous solution of the obtained copolymer 13 was found to be 27.9 mPa·s at 25° C.

Synthesis Example 14

Synthesis of Copolymer 14

In a four-neck flask, 3.0 g of 2-methacryloyloxyethyl acid phosphate (Phosmer M, manufactured by Uni-Chemical Co., Ltd.), 17.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 50° C., and the solution was allowed to undergo polymerization reaction for 24 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 14 in which 100% of the phosphate group was neutralized was synthesized. The viscosity of a 10% by mass aqueous solution of the obtained copolymer 14 was found to be 284 mPa·s at 25° C.

Synthesis Example 15

Synthesis of Copolymer 15

In a four-neck flask, 3.0 g of 2-methacryloyloxyethyl acid phosphate (Phosmer M, manufactured by Uni-Chemical Co., Ltd.), 17.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 15 in which 100% of the phosphate group was neutralized was synthesized. The viscosity of a 10% by mass aqueous solution of the obtained copolymer 15 was found to be 4.4 mPa·s at 25° C.

Synthesis Example 16

Synthesis of Copolymer 16

In a four-neck flask, 3.0 g of 2-methacryloyloxyethyl acid phosphate (Phosmer M, manufactured by Uni-Chemical Co., Ltd.), 17.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 16 in which 100% of the phosphate group was neutralized was synthesized. The viscosity of a 10% by mass aqueous solution of the obtained copolymer 16 was found to be 4.4 mPa·s at 25° C.

Synthesis Example 17

Synthesis of Copolymer 17

In a four-neck flask, 3.0 g of 2-methacryloyloxyethyl acid phosphate (Phosmer M, manufactured by Uni-Chemical Co., Ltd.), 17.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, DMEA (dimethylethanolamine) was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 17 in which 100% of the phosphate group was neutralized was synthesized. The viscosity of a 10% by mass aqueous solution of the obtained copolymer 17 was found to be 4.2 mPa·s at 25° C.

Synthesis Example 18

Synthesis of Copolymer 18

In a four-neck flask, 1.0 g of 2-methacryloyloxyethyl acid phosphate (Phoesmer M, manufactured by Uni-Chemical Co., Id.), 19.0 g of glycerin methacrylate (Blenmer GLM, manufactured by NOF Corp.), and 113.0 g of ethanol were placed and stirred to prepare a uniform solution. After nitrogen was blown into the solution for 30 minutes, 1.33 g of azobisisobutyronitrile was added to the solution at 75° C., and the solution was allowed to undergo polymerization reaction for 3 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 18 in which 100% of the phosphate group was neutralized was synthesized. The viscosity of a 10% by mass aqueous solution of the obtained copolymer 18 was found to be 3.9 mPa·s at 25° C.

Synthesis Example 19

Synthesis of Copolymer 19

In a four-neck flask, 13.0 g of 2-methacryloyloxyethyl acid phosphate (Phosmer M, manufactured by Uni-Chemical Co., Ltd.), 7.0 g of glycerin methacrylate (Blenmer GLM, manufactured by NOF Corp), and 113.0 g of ethanol were placed and stirred to prepare a uniform solution. After nitrogen was blown into the solution for 30 minutes, 1.33 g of azobisisobutyronitrile was added to the solution at 50° C., and the solution was allowed to undergo polymerization reaction for 48 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 19 in which 100% of the phosphate group was neutralized was synthesized. The viscosity of a 10% by mass aqueous solution of the obtained copolymer 19 was found to be 32.0 mPa·s at 25° C.

Comparative Synthesis Example 1

Synthesis of Copolymer 20

In a four-neck flask, 1.5 g of styrene, 18.5 g of glycerin methacrylate (Blenmer GLM, manufactured by NOF Corp), and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 20 in which 100% of the phosphate group was neutralized was synthesized. The viscosity of a 10% by mass aqueous solution of the obtained copolymer 20 was found to be 5.0 mPa·s at 25° C.

Comparative Synthesis Example 2

Synthesis of Copolymer 21

In a four-neck flask, 3.0 g of 2-methacryloyloxyethyl acid phosphate (Phosmer M, manufactured by Uni-Chemical Co., Ltd.), 17.5 g of methacrylic acid, and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 21 in which 100% of the phosphate group was neutralized was synthesized. The viscosity of a 10% by mass aqueous solution of the obtained copolymer 21 was found to be 3.7 mPa·s at 25° C.

Comparative Synthesis Example 3

Synthesis of Copolymer 22

In a four-neck flask, 3.0 g of 2-methacryloyloxyethyl acid phosphate (Phosmer M, manufactured by Uni-Chemical Co., Ltd.), 17.5 g of methacrylic acid, and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 45% acid neutralization, the mixture was purified with a dialysis membrane for 3 days, and the concentration of the mixture was regulated with water so as for the solid content concentration of the mixture to be 10% by mass. In this way, the copolymer 22 in which 45% of the phosphate group was neutralized was synthesized. The viscosity of a 10% by mass aqueous solution of the obtained copolymer 22 was found to be 5.2 mPa·s at 25° C.

Comparative Synthesis Example 4

Synthesis of Copolymer 23

In a four-neck flask, 1.5 g of styrene, 18.5 g of methacrylic acid, and 113.0 g of ethanol were placed and stirred to prepare a uniform solution. After nitrogen was blown into the solution for 30 minutes, 1.33 g of azobisisobutyronitrile was added to the solution at 65° C., and the solution was allowed to undergo polymerization reaction for 5 hours. From the polymerization solution, the solvent was removed with an evaporator, the viscous substance thus obtained was added in acetone, and the resulting solid substance was collected. While the obtained copolymer was being diluted with water, potassium hydroxide was added to the resulting mixture so as to achieve 100% acid neutralization, the mixture was purified with a dialysis membrane for 3 days, and the concentration of the mixture was regulated with water so as for the solid content concentration of the mixture to be 10% by mass. In this way, the copolymer 23 in which 100% of the phosphate group was neutralized was synthesized. The viscosity of a 10% by mass aqueous solution of the obtained copolymer 23 was found to be 10.5 mPa·s at 25° C.

TABLE 1

| | Copolymer | Structural unit represented by general formula (1) | Structural unit represented by structural formula (1) | Content of structural unit of general formula (1) (% by mass) | Viscosity of 10% by mass aqueous solution (mPa · s) | Counter ion $M^+$ | Neutralization rate (%) |
|---|---|---|---|---|---|---|---|
| Synthesis Example 1 | Copolymer 1 | Phosmer M | GLM | 15 | 3.8 | K | 100 |
| Synthesis Example 2 | Copolymer 2 | Phosmer M | GLM | 15 | 4.5 | K, H | 50 |
| Synthesis Example 3 | Copolymer 3 | Phosmer M | GLM | 5 | 4.1 | K | 100 |
| Synthesis Example 4 | Copolymer 4 | Phosmer M | GLM | 15 | 4.3 | K | 100 |
| Synthesis Example 5 | Copolymer 5 | Light Acrylate P-1A | GLM | 15 | 4.2 | K | 100 |
| Synthesis Example 6 | Copolymer 6 | Phosmer M | GLM | 55 | 3.8 | K | 100 |
| Synthesis Example 7 | Copolymer 7 | Phosmer M | GLM | 65 | 4.2 | K | 100 |
| Synthesis Example 8 | Copolymer 8 | Phosmer M | GLM | 55 | 4.2 | K | 100 |
| Synthesis Example 9 | Copolymer 9 | Phosmer M | GLM | 55 | 31.1 | K | 100 |
| Synthesis Example 10 | Copolymer 10 | Phosmer M | GLM | 65 | 28.3 | K | 100 |
| Synthesis Example 11 | Copolymer 11 | Phosmer M | GLM | 55 | 29.0 | K | 100 |
| Synthesis Example 12 | Copolymer 12 | Phosmer M | GLM | 15 | 30.5 | K | 100 |
| Synthesis Example 13 | Copolymer 13 | Phosmer M | GLM | 5 | 27.9 | K | 100 |
| Synthesis Example 14 | Copolymer 14 | Phosmer M | GLM | 15 | 28.4 | K | 100 |
| Synthesis Example 15 | Copolymer 15 | Phosmer M | GLM | 15 | 4.4 | Na | 100 |
| Synthesis Example 16 | Copolymer 16 | Phosmer M | GLM | 15 | 4.4 | Li | 100 |
| Synthesis Example 17 | Copolymer 17 | Phosmer M | GLM | 15 | 4.2 | DMEA | 100 |
| Synthesis Example 18 | Copolymer 18 | Phosmer M | GLM | 5 | 3.9 | K | 100 |
| Synthesis Example 19 | Copolymer 19 | Phosmer M | GLM | 65 | 32.0 | K | 100 |
| Comparative Synthesis Example 1 | Copolymer 20 | Styrene | GLM | 0 | 5.0 | K | 100 |
| Comparative Synthesis Example 2 | Copolymer 21 | Phosmer M | Methacrylic acid | 15 | 3.7 | K | 100 |
| Comparative Synthesis Example 3 | Copolymer 22 | Phosmer M | Methacrylic acid | 15 | 5.2 | K | 45 |
| Comparative Synthesis Example 4 | Copolymer 23 | Styrene | Methacrylic acid | 0 | 10.5 | K | 100 |

Phosmer M: 2-Methacryloyloxyethyl acid phosphate, manufactured by Uni-Chemical Co., Ltd.
GLM: Glycerin methacrylate, Blenmer GLM, manufactured by NOF Corp.
Light Acrylate P-1A: 2-Acryloyloxyethyl acid phosphate, manufactured by Kyoeisha Chemical Co., Ltd.
DMEA: Dimethyl ethanolamine

Pigment Dispersion Preparation Example 1

Preparation of Black Pigment Dispersion 1

A mixture having the following formulation (1) was premixed to prepare a mixed slurry. The mixed slurry was subjected to a circulation dispersion with a disc type media mill (DMR, manufactured by Ashizawa Finetech Ltd.), by using zirconia beads of 0.05 mm in diameter in a filling factor of 55%, at a circumferential speed of 10 m/s, at a liquid temperature of 10° C. for 3 minutes, and then coarse particles were centrifuged with a centrifugal separator (Model-7700, manufactured by Kubota Corp.) to yield a pigment dispersion having a pigment concentration of 16% by mass.
<Formulation (1)>
- Carbon black (NIPEX160, manufactured by Evonik Gegussa GmbH, BET specific surface area: $150^2$, average primary particle size: 20 nm, pH: 4.0, DBP oil absorption amount: 620 g/100 g): 160 parts by mass
- Copolymer 4 (Synthesis Example 4): 20 parts by mass
- Distilled water: 820 parts by mass

Pigment Dispersion Preparation Example 2

Preparation of Black Pigment Dispersion 2

A black pigment dispersion having a pigment concentration of 16% by mass was obtained in the same manner as in Pigment Dispersion Preparation Example 1 except that the amount of the copolymer 4 (Synthesis Example 4) of 20 parts by mass and the amount of distilled water of 820 parts by mass in Pigment Dispersion Preparation Example 1 were altered to 40 parts by mass and 800 parts by mass, respectively.

Pigment Dispersion Preparation Example 3

Preparation of Black Pigment Dispersion 3

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 2 (Synthesis Example 2).

Pigment Dispersion Preparation Example 4

Preparation of Black Pigment Dispersion 4

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 5 (Synthesis Example 5).

Pigment Dispersion Preparation Example 5

Preparation of Black Pigment Dispersion 5

A black pigment dispersion having a pigment concentration of 16% by mass was obtained in the same manner as in Pigment Dispersion Preparation Example 2 except that the amount of the copolymer 4 (Synthesis Example 4) of 20 parts by mass and the amount of distilled water of 820 parts by mass in Pigment Dispersion Preparation Example 2 were altered to 160 parts by mass and 680 parts by mass, respectively.

Pigment Dispersion Preparation Example 6

Preparation of Cyan Pigment Dispersion 1

A blue pigment dispersion having a pigment concentration of 16% by mass was obtained in the same manner as in Pigment Dispersion Preparation Example 2 except that the carbon black in Pigment Dispersion Preparation Example 2 was replaced with Pigment Blue 15:3 (Chromo Fine Blue, manufactured by Dainichiseika Color & Chemicals Mfg. Co., Ltd.).

Pigment Dispersion Preparation Example 7

Preparation of Magenta Pigment Dispersion 1

A reddish purple pigment dispersion having a pigment concentration of 16% by mass was obtained in the same manner as in Pigment Dispersion Preparation Example 2 except that the carbon black in Pigment Dispersion Preparation Example 2 was replaced with Pigment Red 122 (Toner Magenta EO02, manufactured by Clariant GmbH).

Pigment Dispersion Preparation Example 8

Preparation of Yellow Pigment Dispersion 1

A yellow pigment dispersion having a pigment concentration of 16% by mass was obtained in the same manner as in Pigment Dispersion Preparation Example 2 except that the carbon black in Pigment Dispersion Preparation Example 2 was replaced with Pigment Yellow 74 (Fast Yellow 531, manufactured by Dainichiseika Color & Chemicals Mfg. Co., Ltd.).

Pigment Dispersion Preparation Example 9

Preparation of Black Pigment Dispersion 6

A black pigment dispersion having a pigment concentration of 16% by mass was obtained in the same manner as in Pigment Dispersion Preparation Example 2 except that 20 parts by mass of the copolymer 4 (Synthesis Example 4) in Pigment Dispersion Preparation Example 2 was replaced with 400 parts by mass of a 10% by mass aqueous solution of a surfactant (POE (m=40) β-naphthyl ether), and the amount of distilled water of 820 parts by mass in Pigment Dispersion Preparation Example 2 was altered to 440 parts by mass.

Pigment Dispersion Preparation Example 10

Preparation of Cyan Pigment Dispersion 2

A blue pigment dispersion having a pigment concentration of 16% by mass was obtained in the same manner as in Pigment Dispersion Preparation Example 9 except that the carbon black in Pigment Dispersion Preparation Example 9 was replaced with Pigment Blue 15:3 (Chromo Fine Blue, manufactured by Dainichiseika Color & Chemicals Mfg. Co., Ltd.).

Pigment Dispersion Preparation Example 11

Preparation of Magenta Pigment Dispersion 2

A reddish purple pigment dispersion having a pigment concentration of 16% by mass was obtained in the same manner as in Pigment Dispersion Preparation Example 9 except that the carbon black in Pigment Dispersion Preparation Example 9 was replaced with Pigment Red 122 (Toner Magenta EO02, manufactured by Clariant GmbH).

Pigment Dispersion Preparation Example 12

Preparation of Yellow Pigment Dispersion 2

A yellow pigment dispersion having a pigment concentration of 16% by mass was obtained in the same manner as in Pigment Dispersion Preparation Example 9 except that the carbon black in Pigment Dispersion Preparation Example 9 was replaced with Pigment Yellow 74 (Fast Yellow 531, manufactured by Dainichiseika Color & Chemicals Mfg. Co., Ltd.).

Pigment Dispersion Preparation Example 13

Preparation of Black Pigment Dispersion 7

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 1 (Synthesis Example 1).

Pigment Dispersion Preparation Example 14

Preparation of Black Pigment Dispersion 8

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 3 (Synthesis Example 3).

Pigment Dispersion Preparation Example 15

Preparation of Black Pigment Dispersion 9

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 6 (Synthesis Example 6).

Pigment Dispersion Preparation Example 16

Preparation of Black Pigment Dispersion 10

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 7 (Synthesis Example 7).

Pigment Dispersion Preparation Example 17

Preparation of Black Pigment Dispersion 11

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 8 (Synthesis Example 8).

Pigment Dispersion Preparation Example 18

Preparation of Black Pigment Dispersion 12

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 9 (Synthesis Example 9).

Pigment Dispersion Preparation Example 19

Preparation of Black Pigment Dispersion 13

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 10 (Synthesis Example 10).

Pigment Dispersion Preparation Example 20

Preparation of Black Pigment Dispersion 14

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 11 (Synthesis Example 11).

Pigment Dispersion Preparation Example 21

Preparation of Black Pigment Dispersion 15

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 12 (Synthesis Example 12).

Pigment Dispersion Preparation Example 22

Preparation of Black Pigment Dispersion 16

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 13 (Synthesis Example 13).

Pigment Dispersion Preparation Example 23

Preparation of Black Pigment Dispersion 17

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 14 (Synthesis Example 14).

Pigment Dispersion Preparation Example 24

Preparation of Black Pigment Dispersion 18

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 15 (Synthesis Example 15).

Pigment Dispersion Preparation Example 25

Preparation of Black Pigment Dispersion 19

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 16 (Synthesis Example 16).

Pigment Dispersion Preparation Example 26

Preparation of Black Pigment Dispersion 20

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 18 (Synthesis Example 18).

Pigment Dispersion Preparation Example 27

Preparation of Black Pigment Dispersion 21

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 19 (Synthesis Example 19).

Pigment Dispersion Preparation Example 28

Preparation of Black Pigment Dispersion 22

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 20 (Comparative Synthesis Example 1).

Pigment Dispersion Preparation Example 29

Preparation of Black Pigment Dispersion 23

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 21 (Comparative Synthesis Example 2).

Pigment Dispersion Preparation Example 30

Preparation of Black Pigment Dispersion 24

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 23 (Comparative Synthesis Example 4).

Pigment Dispersion Preparation Example 31

Preparation of Black Pigment Dispersion 25

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 17 (Synthesis Example 17).

Pigment Dispersion Preparation Example 32

Preparation of Black Pigment Dispersion 26

A black pigment dispersion having a pigment concentration of 16% by mass was obtained in the same manner as in Pigment Dispersion Preparation Example 2 except that the copolymer 4 (Synthesis Example 4) in Pigment Dispersion Preparation Example 2 was replaced with the copolymer 22 (Comparative Synthesis Example 3).

Hereinafter, the contents of Pigment Dispersion Preparation Examples 1 to 32 are collectively described in Tables 2-1 to 2-4 presented below. The numerical values in Tables 2-1 to 2-4 are given in percent by mass.

TABLE 2-1

| | | Pigment dispersions | | | | | | | | | |
|---|---|---|---|---|---|---|---|---|---|---|---|
| | | 1 | 2 | 3 | 4 | 5 | 6 | 7 | 8 | 9 | 10 |
| Synthesis Example 1 | Copolymer 1 | — | — | | — | — | — | — | — | — | — |
| Synthesis Example 2 | Copolymer 2 | — | — | 4 | — | — | — | — | — | — | — |
| Synthesis Example 3 | Copolymer 3 | — | — | | — | — | — | — | — | — | — |

TABLE 2-1-continued

|  |  | Pigment dispersions | | | | | | | | | |
|---|---|---|---|---|---|---|---|---|---|---|
|  |  | 1 | 2 | 3 | 4 | 5 | 6 | 7 | 8 | 9 | 10 |
| Synthesis Example 4 | Copolymer 4 | 2 | 4 | — | — | 16 | 4 | 4 | 4 | — | — |
| Synthesis Example 5 | Copolymer 5 | — | — | — | 4 | — | — | — | — | — | — |
| Synthesis Example 6 | Copolymer 6 | — | — | — | — | — | — | — | — | — | — |
| Synthesis Example 7 | Copolymer 7 | — | — | — | — | — | — | — | — | — | — |
| Synthesis Example 8 | Copolymer 8 | — | — | — | — | — | — | — | — | — | — |
| Synthesis Example 9 | Copolymer 9 | — | — | — | — | — | — | — | — | — | — |
| Synthesis Example 10 | Copolymer 10 | — | — | — | — | — | — | — | — | — | — |
| Synthesis Example 11 | Copolymer 11 | — | — | — | — | — | — | — | — | — | — |
| Synthesis Example 12 | Copolymer 12 | — | — | — | — | — | — | — | — | — | — |
| Synthesis Example 13 | Copolymer 13 | — | — | — | — | — | — | — | — | — | — |
| Synthesis Example 14 | Copolymer 14 | — | — | — | — | — | — | — | — | — | — |
| Synthesis Example 15 | Copolymer 15 | — | — | — | — | — | — | — | — | — | — |
| Synthesis Example 16 | Copolymer 16 | — | — | — | — | — | — | — | — | — | — |
| Synthesis Example 17 | Copolymer 17 | — | — | — | — | — | — | — | — | — | — |
| Synthesis Example 18 | Copolymer 18 | — | — | — | — | — | — | — | — | — | — |
| Synthesis Example 19 | Copolymer 19 | — | — | — | — | — | — | — | — | — | — |
| Comparative Synthesis Example 1 | Copolymer 20 | — | — | — | — | — | — | — | — | — | — |
| Comparative Synthesis Example 2 | Copolymer 21 | — | — | — | — | — | — | — | — | — | — |
| Comparative Synthesis Example 3 | Copolymer 22 | — | — | — | — | — | — | — | — | — | — |
| Comparative Synthesis Example 4 | Copolymer 23 | — | — | — | — | — | — | — | — | — | — |
| Dispersant (surfactant) | | — | — | — | — | — | — | — | — | 4 | 4 |
| Carbon black | | 16 | 16 | 16 | 16 | 16 | — | — | — | 16 | — |
| Pigment Blue 15:3 | | — | — | — | — | — | 16 | — | — | — | 16 |
| Pigment Red 122 | | — | — | — | — | — | — | 16 | — | — | — |
| Pigment Yellow 74 | | — | — | — | — | — | — | — | 16 | — | — |
| Pure water | | Balance | Balance | Balance | Balance | Balance | Balance | Balance | Balance | Balance | Balance |
| Total (% by mass) | | 100 | 100 | 100 | 100 | 100 | 100 | 100 | 100 | 100 | 100 |

TABLE 2-2

|  |  | Pigment dispersions | | | | | | | | | |
|---|---|---|---|---|---|---|---|---|---|---|
|  |  | 11 | 12 | 13 | 14 | 15 | 16 | 17 | 18 | 19 | 20 |
| Synthesis Example 1 | Copolymer 1 | — | — | 4 | — | — | — | — | — | — | — |
| Synthesis Example 2 | Copolymer 2 | — | — | — | — | — | — | — | — | — | — |
| Synthesis Example 3 | Copolymer 3 | — | — | — | 4 | — | — | — | — | — | — |
| Synthesis Example 4 | Copolymer 4 | — | — | — | — | — | — | — | — | — | — |
| Synthesis Example 5 | Copolymer 5 | — | — | — | — | — | — | — | — | — | — |
| Synthesis Example 6 | Copolymer 6 | — | — | — | — | 4 | — | — | — | — | — |
| Synthesis Example 7 | Copolymer 7 | — | — | — | — | — | 4 | — | — | — | — |
| Synthesis Example 8 | Copolymer 8 | — | — | — | — | — | — | 4 | — | — | — |
| Synthesis Example 9 | Copolymer 9 | — | — | — | — | — | — | — | 4 | — | — |
| Synthesis Example 10 | Copolymer 10 | — | — | — | — | — | — | — | — | 4 | — |
| Synthesis Example 11 | Copolymer 11 | — | — | — | — | — | — | — | — | — | 4 |
| Synthesis Example 12 | Copolymer 12 | — | — | — | — | — | — | — | — | — | — |
| Synthesis Example 13 | Copolymer 13 | — | — | — | — | — | — | — | — | — | — |
| Synthesis Example 14 | Copolymer 14 | — | — | — | — | — | — | — | — | — | — |
| Synthesis Example 15 | Copolymer 15 | — | — | — | — | — | — | — | — | — | — |
| Synthesis Example 16 | Copolymer 16 | — | — | — | — | — | — | — | — | — | — |

TABLE 2-2-continued

|  |  | Pigment dispersions |  |  |  |  |  |  |  |  |  |
|---|---|---|---|---|---|---|---|---|---|---|---|
|  |  | 11 | 12 | 13 | 14 | 15 | 16 | 17 | 18 | 19 | 20 |
| Synthesis Example 17 | Copolymer 17 | — | — | — | — | — | — | — | — | — | — |
| Synthesis Example 18 | Copolymer 18 | — | — | — | — | — | — | — | — | — | — |
| Synthesis Example 19 | Copolymer 19 | — | — | — | — | — | — | — | — | — | — |
| Comparative Synthesis Example 1 | Copolymer 20 | — | — | — | — | — | — | — | — | — | — |
| Comparative Synthesis Example 2 | Copolymer 21 | — | — | — | — | — | — | — | — | — | — |
| Comparative Synthesis Example 3 | Copolymer 22 | — | — | — | — | — | — | — | — | — | — |
| Comparative Synthesis Example 4 | Copolymer 23 | — | — | — | — | — | — | — | — | — | — |
| Dispersant (surfactant) |  | 4 | 4 | — | — | — | — | — | — | — | — |
| Carbon black |  | — | — | 16 | 16 | 16 | 16 | 16 | 16 | 16 | 16 |
| Pigment Blue 15:3 |  | — | — | — | — | — | — | — | — | — | — |
| Pigment Red 122 |  | 16 | — | — | — | — | — | — | — | — | — |
| Pigment Yellow 74 |  | — | 16 | — | — | — | — | — | — | — | — |
| Pure water |  | Balance | Balance | Balance | Balance | Balance | Balance | Balance | Balance | Balance | Balance |
| Total (% by mass) |  | 100 | 100 | 100 | 100 | 100 | 100 | 100 | 100 | 100 | 100 |

TABLE 2-3

|  |  | Pigment dispersions |  |  |  |  |  |  |  |  |  |
|---|---|---|---|---|---|---|---|---|---|---|---|
|  |  | 21 | 22 | 23 | 24 | 25 | 26 | 27 | 28 | 29 | 30 |
| Synthesis Example 1 | Copolymer 1 | — | — | — | — | — | — | — | — | — | — |
| Synthesis Example 2 | Copolymer 2 | — | — | — | — | — | — | — | — | — | — |
| Synthesis Example 3 | Copolymer 3 | — | — | — | — | — | — | — | — | — | — |
| Synthesis Example 4 | Copolymer 4 | — | — | — | — | — | — | — | — | — | — |
| Synthesis Example 5 | Copolymer 5 | — | — | — | — | — | — | — | — | — | — |
| Synthesis Example 6 | Copolymer 6 | — | — | — | — | — | — | — | — | — | — |
| Synthesis Example 7 | Copolymer 7 | — | — | — | — | — | — | — | — | — | — |
| Synthesis Example 8 | Copolymer 8 | — | — | — | — | — | — | — | — | — | — |
| Synthesis Example 9 | Copolymer 9 | — | — | — | — | — | — | — | — | — | — |
| Synthesis Example 10 | Copolymer 10 | — | — | — | — | — | — | — | — | — | — |
| Synthesis Example 11 | Copolymer 11 | — | — | — | — | — | — | — | — | — | — |
| Synthesis Example 12 | Copolymer 12 | 4 | — | — | — | — | — | — | — | — | — |
| Synthesis Example 13 | Copolymer 13 | — | 4 | — | — | — | — | — | — | — | — |
| Synthesis Example 14 | Copolymer 14 | — | — | 4 | — | — | — | — | — | — | — |
| Synthesis Example 15 | Copolymer 15 | — | — | — | 4 | — | — | — | — | — | — |
| Synthesis Example 16 | Copolymer 16 | — | — | — | — | 4 | — | — | — | — | — |
| Synthesis Example 17 | Copolymer 17 | — | — | — | — | — | — | — | — | — | — |
| Synthesis Example 18 | Copolymer 18 | — | — | — | — | — | 4 | — | — | — | — |
| Synthesis Example 19 | Copolymer 19 | — | — | — | — | — | — | 4 | — | — | — |
| Comparative Synthesis Example 1 | Copolymer 20 | — | — | — | — | — | — | — | 4 | — | — |
| Comparative Synthesis Example 2 | Copolymer 21 | — | — | — | — | — | — | — | — | 4 | — |
| Comparative Synthesis Example 3 | Copolymer 22 | — | — | — | — | — | — | — | — | — | — |
| Comparative Synthesis Example 4 | Copolymer 23 | — | — | — | — | — | — | — | — | — | 4 |
| Dispersant (surfactant) |  | — | — | — | — | — | — | — | — | — | — |
| Carbon black |  | 16 | 16 | 16 | 16 | 16 | 16 | 16 | 16 | 16 | 16 |
| Pigment Blue 15:3 |  | — | — | — | — | — | — | — | — | — | — |

TABLE 2-3-continued

|  | Pigment dispersions | | | | | | | | | |
|---|---|---|---|---|---|---|---|---|---|---|
|  | 21 | 22 | 23 | 24 | 25 | 26 | 27 | 28 | 29 | 30 |
| Pigment Red 122 | — | — | — | — | — | — | — | — | — | — |
| Pigment Yellow 74 | — | — | — | — | — | — | — | — | — | — |
| Pure water | Balance | Balance | Balance | Balance | Balance | Balance | Balance | Balance | Balance | Balance |
| Total (% by mass) | 100 | 100 | 100 | 100 | 100 | 100 | 100 | 100 | 100 | 100 |

TABLE 2-4

|  |  | Pigment dispersions | |
|---|---|---|---|
|  |  | 31 | 32 |
| Synthesis Example 1 | Copolymer 1 | — | — |
| Synthesis Example 2 | Copolymer 2 | — | — |
| Synthesis Example 3 | Copolymer 3 | — | — |
| Synthesis Example 4 | Copolymer 4 | — | — |
| Synthesis Example 5 | Copolymer 5 | — | — |
| Synthesis Example 6 | Copolymer 6 | — | — |
| Synthesis Example 7 | Copolymer 7 | — | — |
| Synthesis Example 8 | Copolymer 8 | — | — |
| Synthesis Example 9 | Copolymer 9 | — | — |
| Synthesis Example 10 | Copolymer 10 | — | — |
| Synthesis Example 11 | Copolymer 11 | — | — |
| Synthesis Example 12 | Copolymer 12 | — | — |
| Synthesis Example 13 | Copolymer 13 | — | — |
| Synthesis Example 14 | Copolymer 14 | — | — |
| Synthesis Example 15 | Copolymer 15 | — | — |
| Synthesis Example 16 | Copolymer 16 | — | — |
| Synthesis Example 17 | Copolymer 17 | 4 | — |
| Synthesis Example 18 | Copolymer 18 | — | — |
| Synthesis Example 19 | Copolymer 19 | — | — |
| Comparative Synthesis Example 1 | Copolymer 20 | — | — |
| Comparative Synthesis Example 2 | Copolymer 21 | — | — |
| Comparative Synthesis Example 3 | Copolymer 22 | — | 4 |
| Comparative Synthesis Example 4 | Copolymer 23 | — | — |
| Dispersant (surfactant) |  | — | — |
| Carbon black |  | 16 | 16 |
| Pigment Blue 15:3 |  | — | — |
| Pigment Red 122 |  | — | — |
| Pigment Yellow 74 |  | — | — |
| Pure water |  | Balance | Balance |
| Total (% by mass) |  | 100 | 100 |

The details of the components in Tables 2-1 to 2-4 are as follows.
 Dispersant (surfactant): POE (m=40) β-naphthyl ether, manufactured by Takemoto Oil & Fat Co., Ltd.
 Carbon black (NIPEX160, manufactured by Evonik Gegussa GmbH)
 Pigment Blue 15:3 (Chromo Fine Blue, manufactured by Dainichiseika Color & Chemicals Mfg. Co., Ltd.)
 Pigment Red 122 (Toner Magenta EO02, manufactured by Clariant GmbH)
 Pigment Yellow 74 (Fast Yellow 531, manufactured by Dainichiseika Color & Chemicals Mfg. Co., Ltd.)

Example 1

Preparation of Inkjet Recording Ink

The following ink formulation was mixed, and stirred for 1 hour to be uniformly mixed. The resulting dispersion was pressure filtered with a polyvinylidene fluoride membrane filter of 5.0 m in average pore size, to remove coarse particles and dust, and thus, an inkjet recording ink of Example 1 was prepared.
<Ink Formulation>
 The pigment dispersion 1 (pigment concentration: 16% by mass) of Pigment Dispersion Preparation Example 1: 50.0 parts by mass
 Glycerin: 10.0 parts by mass
 1,3-Butanediol: 20.0 parts by mass
 Pure water: 20.0 parts by mass Examples 2 to 26 and Comparative Examples 1 to 8

Preparation of Inks for Ink Jet Recording

The inkjet recording inks of Examples 2 to 26 and Comparative Examples 1 to 8 were prepared in the same manner as in Example 1 except that the ink formulation in Example 1 was altered to the ink formulations shown in Tables 3-1 to 3-4. The numerical values of the individual components in Tables 3-1 to 3-4 are given in percent by mass.

Example 27

Preparation of Inkjet Recording Ink

The inkjet recording ink of Example 27 was prepared in the same manner as in Example 1 except that the ink formulation in Example 1 was altered to the following ink formulation. The ink formulation is shown in Table 3-5.
<Ink Formulation>
 The pigment dispersion 9 (pigment concentration: 16% by mass) of Pigment Dispersion Preparation Example 9: 50.0 parts by mass
 Additive (copolymer 4): 4.0 parts by mass
 Glycerin: 10.0 parts by mass
 1,3-Butanediol: 20.0 parts by mass
 Pure water: 16.0 parts by mass Example 28

Preparation of Inkjet Recording Ink

The inkjet recording ink of Example 28 was prepared in the same manner as in Example 1 except that the ink formulation in Example 1 was altered to the following ink formulation. The ink formulation is shown in Table 3-5.
<Ink Formulation>
 The pigment dispersion 9 (pigment concentration: 16% by mass) of Pigment Dispersion Preparation Example 9: 50.0 parts by mass
 Additives (copolymer 5): 4.0 parts by mass
 Glycerin: 10.0 parts by mass
 1,3-Butanediol: 20.0 parts by mass
 Pure water: 16.0 parts by mass

Example 29

Preparation of Inkjet Recording Ink

The inkjet recording ink of Example 29 was prepared in the same manner as in Example 1 except that the ink formulation in Example 1 was altered to the following ink formulation.

The ink formulation is shown in Table 3-5.

<Ink Formulation>
The pigment dispersion 10 (pigment concentration: 16% by mass) of Pigment Dispersion Preparation Example 10: 30.0 parts by mass
Additives (copolymer 18): 4.0 parts by mass
Glycerin: 10.0 parts by mass
1,3-Butanediol: 20.0 parts by mass
Pure water: 36.0 parts by mass

TABLE 3-1

|  |  | Examples |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Pigment dispersions | Pigment dispersion 1 | 50 | — | — | — | — | — | — | — | — | — |
|  | Pigment dispersion 2 | — | 50 | — | 50 | 50 | — | — | — | — | — |
|  | Pigment dispersion 3 | — | — | 50 | — | — | — | — | — | — | — |
|  | Pigment dispersion 4 | — | — | — | — | — | — | 50 | — | — | — |
|  | Pigment dispersion 5 | — | — | — | — | — | 50 | — | — | — | — |
|  | Pigment dispersion 6 | — | — | — | — | — | — | — | 30 | — | — |
|  | Pigment dispersion 7 | — | — | — | — | — | — | — | — | 50 | — |
|  | Pigment dispersion 8 | — | — | — | — | — | — | — | — | — | 30 |
|  | Pigment dispersion 9 | — | — | — | — | — | — | — | — | — | — |
|  | Pigment dispersion 10 | — | — | — | — | — | — | — | — | — | — |
|  | Pigment dispersion 11 | — | — | — | — | — | — | — | — | — | — |
|  | Pigment dispersion 12 | — | — | — | — | — | — | — | — | — | — |
|  | Pigment dispersion 13 | — | — | — | — | — | — | — | — | — | — |
|  | Pigment dispersion 14 | — | — | — | — | — | — | — | — | — | — |
|  | Pigment dispersion 15 | — | — | — | — | — | — | — | — | — | — |
|  | Pigment dispersion 16 | — | — | — | — | — | — | — | — | — | — |
|  | Pigment dispersion 17 | — | — | — | — | — | — | — | — | — | — |
|  | Pigment dispersion 18 | — | — | — | — | — | — | — | — | — | — |
|  | Pigment dispersion 19 | — | — | — | — | — | — | — | — | — | — |
|  | Pigment dispersion 20 | — | — | — | — | — | — | — | — | — | — |
|  | Pigment dispersion 21 | — | — | — | — | — | — | — | — | — | — |
|  | Pigment dispersion 22 | — | — | — | — | — | — | — | — | — | — |
|  | Pigment dispersion 23 | — | — | — | — | — | — | — | — | — | — |
|  | Pigment dispersion 24 | — | — | — | — | — | — | — | — | — | — |
|  | Pigment dispersion 25 | — | — | — | — | — | — | — | — | — | — |
|  | Pigment dispersion 26 | — | — | — | — | — | — | — | — | — | — |
|  | Pigment dispersion 27 | — | — | — | — | — | — | — | — | — | — |
|  | Pigment dispersion 28 | — | — | — | — | — | — | — | — | — | — |
|  | Pigment dispersion 29 | — | — | — | — | — | — | — | — | — | — |
|  | Pigment dispersion 30 | — | — | — | — | — | — | — | — | — | — |
|  | Pigment dispersion 31 | — | — | — | — | — | — | — | — | — | — |
|  | Pigment dispersion 32 | — | — | — | — | — | — | — | — | — | — |
| Water soluble solvents | Glycerin | 10 | 10 | 10 | — | 20 | 10 | 10 | 10 | 10 | 10 |
|  | 1,3-Butanediol | 20 | 20 | 20 | 30 | — | 20 | 20 | 20 | 20 | 20 |
|  | Trimethylolpropane | — | — | — | — | 5 | — | — | — | — | — |
|  | 2-Pyrrolodone | — | — | — | — | 5 | — | — | — | — | — |
| Solvent | Pure water | Balance | Balance | Balance | Balance | Balance | Balance | Balance | Balance | Balance | Balance |
|  | Total (% by mass) | 100 | 100 | 100 | 100 | 100 | 100 | 100 | 100 | 100 | 100 |

TABLE 3-2

|  |  | Examples |  |  |  |  |  |  |  |  |  |
|---|---|---|---|---|---|---|---|---|---|---|---|
|  |  | 11 | 12 | 13 | 14 | 15 | 16 | 17 | 18 | 19 | 20 |
| Pigment dispersions | Pigment dispersion 1 | — | — | — | — | — | — | — | — | — | — |
|  | Pigment dispersion 2 | — | — | — | — | — | — | — | — | — | — |
|  | Pigment dispersion 3 | — | — | — | — | — | — | — | — | — | — |
|  | Pigment dispersion 4 | — | — | — | — | — | — | — | — | — | — |
|  | Pigment dispersion 5 | — | — | — | — | — | — | — | — | — | — |
|  | Pigment dispersion 6 | — | — | — | — | — | — | — | — | — | — |
|  | Pigment dispersion 7 | — | — | — | — | — | — | — | — | — | — |
|  | Pigment dispersion 8 | — | — | — | — | — | — | — | — | — | — |
|  | Pigment dispersion 9 | — | — | — | — | — | — | — | — | — | — |
|  | Pigment dispersion 10 | — | — | — | — | — | — | — | — | — | — |
|  | Pigment dispersion 11 | — | — | — | — | — | — | — | — | — | — |
|  | Pigment dispersion 12 | — | — | — | — | — | — | — | — | — | — |
|  | Pigment dispersion 13 | 50 | — | — | — | — | — | — | — | — | — |
|  | Pigment dispersion 14 | — | 50 | — | — | — | — | — | — | — | — |
|  | Pigment dispersion 15 | — | — | 50 | — | — | — | — | — | — | — |
|  | Pigment dispersion 16 | — | — | — | 50 | — | — | — | — | — | — |

TABLE 3-2-continued

|  |  | Examples | | | | | | | | | |
|---|---|---|---|---|---|---|---|---|---|---|
|  |  | 11 | 12 | 13 | 14 | 15 | 16 | 17 | 18 | 19 | 20 |
|  | Pigment dispersion 17 | — | — | — | — | 50 | — | — | — | — | — |
|  | Pigment dispersion 18 | — | — | — | — | — | 50 | — | — | — | — |
|  | Pigment dispersion 19 | — | — | — | — | — | — | 50 | — | — | — |
|  | Pigment dispersion 20 | — | — | — | — | — | — | — | 50 | — | — |
|  | Pigment dispersion 21 | — | — | — | — | — | — | — | — | 50 | — |
|  | Pigment dispersion 22 | — | — | — | — | — | — | — | — | — | 50 |
|  | Pigment dispersion 23 | — | — | — | — | — | — | — | — | — | — |
|  | Pigment dispersion 24 | — | — | — | — | — | — | — | — | — | — |
|  | Pigment dispersion 25 | — | — | — | — | — | — | — | — | — | — |
|  | Pigment dispersion 26 | — | — | — | — | — | — | — | — | — | — |
|  | Pigment dispersion 27 | — | — | — | — | — | — | — | — | — | — |
|  | Pigment dispersion 28 | — | — | — | — | — | — | — | — | — | — |
|  | Pigment dispersion 29 | — | — | — | — | — | — | — | — | — | — |
|  | Pigment dispersion 30 | — | — | — | — | — | — | — | — | — | — |
|  | Pigment dispersion 31 | — | — | — | — | — | — | — | — | — | — |
|  | Pigment dispersion 32 | — | — | — | — | — | — | — | — | — | — |
| Water soluble solvents | Glycerin | 10 | 10 | 10 | 10 | 10 | 10 | 10 | 10 | 10 | 10 |
|  | 1,3-Butanediol | 20 | 20 | 20 | 20 | 20 | 20 | 20 | 20 | 20 | 20 |
|  | Trimethylolpropane | — | — | — | — | — | — | — | — | — | — |
|  | 2-Pyrrolodone | — | — | — | — | — | — | — | — | — | — |
| Solvent | Pure water | Balance | Balance | Balance | Balance | Balance | Balance | Balance | Balance | Balance | Balance |
|  | Total (% by mass) | 100 | 100 | 100 | 100 | 100 | 100 | 100 | 100 | 100 | 100 |

TABLE 3-3

|  |  | Examples | | | | | |
|---|---|---|---|---|---|---|---|
|  |  | 21 | 22 | 23 | 24 | 25 | 26 |
| Pigment dispersions | Pigment dispersion 1 | — | — | — | — | — | — |
|  | Pigment dispersion 2 | — | — | — | — | — | — |
|  | Pigment dispersion 3 | — | — | — | — | — | — |
|  | Pigment dispersion 4 | — | — | — | — | — | — |
|  | Pigment dispersion 5 | — | — | — | — | — | — |
|  | Pigment dispersion 6 | — | — | — | — | — | — |
|  | Pigment dispersion 7 | — | — | — | — | — | — |
|  | Pigment dispersion 8 | — | — | — | — | — | — |
|  | Pigment dispersion 9 | — | — | — | — | — | — |
|  | Pigment dispersion 10 | — | — | — | — | — | — |
|  | Pigment dispersion 11 | — | — | — | — | — | — |
|  | Pigment dispersion 12 | — | — | — | — | — | — |
|  | Pigment dispersion 13 | — | — | — | — | — | — |
|  | Pigment dispersion 14 | — | — | — | — | — | — |
|  | Pigment dispersion 15 | — | — | — | — | — | — |
|  | Pigment dispersion 16 | — | — | — | — | — | — |
|  | Pigment dispersion 17 | — | — | — | — | — | — |
|  | Pigment dispersion 18 | — | — | — | — | — | — |
|  | Pigment dispersion 19 | — | — | — | — | — | — |
|  | Pigment dispersion 20 | — | — | — | — | — | — |
|  | Pigment dispersion 21 | — | — | — | — | — | — |
|  | Pigment dispersion 22 | — | — | — | — | — | — |
|  | Pigment dispersion 23 | 50 | — | — | — | — | — |
|  | Pigment dispersion 24 | — | 50 | — | — | — | — |
|  | Pigment dispersion 25 | — | — | 50 | — | — | — |
|  | Pigment dispersion 26 | — | — | — | 50 | — | — |
|  | Pigment dispersion 27 | — | — | — | — | 50 | — |
|  | Pigment dispersion 28 | — | — | — | — | — | — |
|  | Pigment dispersion 29 | — | — | — | — | — | — |
|  | Pigment dispersion 30 | — | — | — | — | — | — |
|  | Pigment dispersion 31 | — | — | — | — | — | 50 |
|  | Pigment dispersion 32 | — | — | — | — | — | — |
| Water soluble solvents | Glycerin | 10 | 10 | 10 | 10 | 10 | 10 |
|  | 1,3-Butanediol | 20 | 20 | 20 | 20 | 20 | 20 |
|  | Trimethylolpropane | — | — | — | — | — | — |
|  | 2-Pyrrolodone | — | — | — | — | — | — |
| Solvent | Pure water | Balance | Balance | Balance | Balance | Balance | Balance |
|  | Total (% by mass) | 100 | 100 | 100 | 100 | 100 | 100 |

TABLE 3-4

| | | Comparative Examples | | | | | | | |
|---|---|---|---|---|---|---|---|---|---|
| | | 1 | 2 | 3 | 4 | 5 | 6 | 7 | 8 |
| Pigment dispersions | Pigment dispersion 1 | — | — | — | — | — | — | — | — |
| | Pigment dispersion 2 | — | — | — | — | — | — | — | — |
| | Pigment dispersion 3 | — | — | — | — | — | — | — | — |
| | Pigment dispersion 4 | — | — | — | — | — | — | — | — |
| | Pigment dispersion 5 | — | — | — | — | — | — | — | — |
| | Pigment dispersion 6 | — | — | — | — | — | — | — | — |
| | Pigment dispersion 7 | — | — | — | — | — | — | — | — |
| | Pigment dispersion 8 | — | — | — | — | — | — | — | — |
| | Pigment dispersion 9 | — | — | — | 50 | — | — | — | — |
| | Pigment dispersion 10 | — | — | — | — | 30 | — | — | — |
| | Pigment dispersion 11 | — | — | — | — | — | 50 | — | — |
| | Pigment dispersion 12 | — | — | — | — | — | — | 30 | — |
| | Pigment dispersion 13 | — | — | — | — | — | — | — | — |
| | Pigment dispersion 14 | — | — | — | — | — | — | — | — |
| | Pigment dispersion 15 | — | — | — | — | — | — | — | — |
| | Pigment dispersion 16 | — | — | — | — | — | — | — | — |
| | Pigment dispersion 17 | — | — | — | — | — | — | — | — |
| | Pigment dispersion 18 | — | — | — | — | — | — | — | — |
| | Pigment dispersion 19 | — | — | — | — | — | — | — | — |
| | Pigment dispersion 20 | — | — | — | — | — | — | — | — |
| | Pigment dispersion 21 | — | — | — | — | — | — | — | — |
| | Pigment dispersion 22 | — | — | — | — | — | — | — | — |
| | Pigment dispersion 23 | — | — | — | — | — | — | — | — |
| | Pigment dispersion 24 | — | — | — | — | — | — | — | — |
| | Pigment dispersion 25 | — | — | — | — | — | — | — | — |
| | Pigment dispersion 26 | — | — | — | — | — | — | — | — |
| | Pigment dispersion 27 | — | — | — | — | — | — | — | — |
| | Pigment dispersion 28 | 50 | — | — | — | — | — | — | — |
| | Pigment dispersion 29 | — | 50 | — | — | — | — | — | — |
| | Pigment dispersion 30 | — | — | 50 | — | — | — | — | — |
| | Pigment dispersion 31 | — | — | — | — | — | — | — | — |
| | Pigment dispersion 32 | — | — | — | — | — | — | — | 50 |
| Water soluble solvents | Glycerin | 10 | 10 | 10 | 10 | 10 | 10 | 10 | 10 |
| | 1,3-Butanediol | 20 | 20 | 20 | 20 | 20 | 20 | 20 | 20 |
| | Trimethylolpropane | — | — | — | — | — | — | — | — |
| | 2-Pyrrolodone | — | — | — | — | — | — | — | — |
| Solvent | Pure water | Balance | Balance | Balance | Balance | Balance | Balance | Balance | Balance |
| Total (% by mass) | | 100 | 100 | 100 | 100 | 100 | 100 | 100 | 100 |

TABLE 3-5

| | | Examples | | |
|---|---|---|---|---|
| | | 27 | 28 | 29 |
| Pigment dispersions | Pigment dispersion 9 | 50 | 50 | — |
| | Pigment dispersion 10 | — | — | 30 |
| Additives | Copolymer 3 | 4 | — | — |
| | Copolymer 4 | — | 4 | — |
| | Copolymer 17 | — | — | 4 |
| Water soluble solvents | Glycerin | 10 | 10 | 10 |
| | 1,3-Butanediol | 20 | 20 | 20 |
| | Trimethylolpropane | — | — | — |
| | 2-Pyrrolodone | — | — | — |
| Solvent | Pure water | Balance | Balance | Balance |
| Total (% by mass) | | 100 | 100 | 100 |

<Measurement of Initial Viscosities and Evaluation of Storage Stabilities of Pigment Dispersions and Inks>

For the measurement of the viscosities of the pigment dispersions and the inkjet recording inks of Pigment Dispersion Preparation Examples 1 to 32, Examples 1 to 29 and Comparative Examples 1 to 8, the viscometer RE80L manufactured by Told Sangyo Co., Ltd. was used to measure the viscosities at 25° C.

The number of rotations at the time of the measurement of the viscosity was regulated so as for the torque to be constant within a range from 40% to 80%. As the indices of the dispersion stabilities of the pigment as the pigment dispersion and the inkjet recording ink, the initial viscosities, after the preparation, of the pigment dispersions and the inkjet recording inks were measured and evaluated on the basis of the following standards. The results thus obtained are shown in Table 4.

In the storage stability evaluation, after the measurement of the initial viscosity, each of the pigment dispersions and the inkjet recording inks was placed in a polyethylene vessel, hermetically sealed in the vessel and stored at 70° C. for 1 week, and then the viscosity was measured and evaluated in terms of the variation rate from the initial viscosity on the basis of the following standards. The results thus obtained are shown in Table 4.

[Evaluation Standards of Pigment Dispersion]
—Initial Viscosity—

A: The initial viscosity value is less than 3 mPa·s.

B: The initial viscosity value is 3 mPa·s or more and less than 7 mPa·s.

D: The initial viscosity value is 7 mPa·s or more.

—Storage Stability—

A: The variation rate of the viscosity after the storage with reference to the initial viscosity is less than 5%.

B: The variation rate of the viscosity after the storage with reference to the initial viscosity is 5% or more and less than 50%.

D: The variation rate of the viscosity after the storage with reference to the initial viscosity is 50% or more.

[Evaluation Standards of Ink]
—Initial Viscosity—
A: The initial viscosity value is less than 9 mPa·s.
B: The initial viscosity value is 9 mPa·s or more and less than 20 mPa·s.
D: The initial viscosity value is 20 mPa·s or more.
—Storage Stability—
A: The variation rate of the viscosity after the storage with reference to the initial viscosity is less than 5%.
B: The variation rate of the viscosity after the storage with reference to the initial viscosity is 5% or more and less than 50%.
D: The variation rate of the viscosity after the storage with reference to the initial viscosity is 50% or more.

<Printing Evaluation of Ink Sets>

For each of the recording inks of Example 1 to 29 and Comparative Examples 1 to 8, a printing evaluation was performed as follows.

An inkjet printer (IPSiO GX3000, manufactured by Ricoh Co., Ltd) was used, the driving voltage of a piezoelectric element was varied so as for the ink ejection amount to be uniform and the ink adhesion amount on the recording medium to be free from variation, and the following image density was measured for each of the inks and evaluated on the basis of the following evaluation standards. The results thus obtained are shown in Table 4.

<Image Density>>

A chart prepared by using Microsoft Word 2003 (product of Microsoft Corp) on which 64 point black squares in black and other colors were written was printed on a sheet of a high-quality MY Paper (manufactured by Ricoh Co., Ltd.) having a basis weight of 69.6 g/m$^2$, a sizing degree of 23.2 seconds, and an air permeability of 21.0 seconds, and then the image densities were evaluated by measuring the colors of the black squares by using X-Rite 938 (manufactured by X-Rite, Inc). In this case, the print mode was set at the "plain paper-fast" mode with the attached driver. The evaluations of the image densities of the respective colors were performed on the basis of the following standards.

[Evaluation Standards]
A: OD value: black, 1.20 or more,
yellow, 0.75 or more,
magenta, 0.90 or more, or
cyan, 1.00 or more
B: OD value: black, 1.10 or more and less than 1.20,
yellow, 0.70 or more and less than 0.75,
magenta, 0.80 or more and less than 0.90, or
cyan, 0.90 or more and less than 1.00
C: OD value: black 1.00 or more and less than 1.10,
yellow, 0.65 or more and less than 0.70,
magenta, 0.70 or more and less than 0.80, or,
cyan, 0.80 or more and less than 0.90
D: OD value: black, less than 1.00,
yellow, less than 0.65,
magenta, less than 0.70, or
cyan, less than 0.80

TABLE 4

|  |  | Pigment dispersions | | Ink | | |
| --- | --- | --- | --- | --- | --- | --- |
| Ink | Type | Initial viscosity | Storage stability | Initial viscosity | Storage stability | Image density |
| Example 1 | Pigment dispersion 1 | A | B | A | B | A |
| Example 2 | Pigment dispersion 2 | A | A | B | B | A |
| Example 3 | Pigment dispersion 3 | A | A | A | B | B |
| Example 4 | Pigment dispersion 2 | A | A | B | B | A |
| Example 5 | Pigment dispersion 2 | A | A | B | B | A |
| Example 6 | Pigment dispersion 5 | B | A | B | A | A |
| Example 7 | Pigment dispersion 4 | A | A | B | B | A |
| Example 8 | Pigment dispersion 6 | A | A | B | B | A |
| Example 9 | Pigment dispersion 7 | A | A | B | B | A |
| Example 10 | Pigment dispersion 8 | A | A | B | B | A |
| Example 11 | Pigment dispersion 13 | A | A | B | B | B |
| Example 12 | Pigment dispersion 14 | A | A | B | B | B |
| Example 13 | Pigment dispersion 15 | A | A | B | B | B |
| Example 14 | Pigment dispersion 16 | B | A | B | B | A |
| Example 15 | Pigment dispersion 17 | A | A | B | B | A |
| Example 16 | Pigment dispersion 18 | B | A | B | B | A |
| Example 17 | Pigment dispersion 19 | A | B | B | B | A |
| Example 18 | Pigment dispersion 20 | A | A | B | B | A |
| Example 19 | Pigment dispersion 21 | A | B | B | B | A |
| Example 20 | Pigment dispersion 22 | A | A | B | B | B |
| Example 21 | Pigment dispersion 23 | A | A | B | B | A |
| Example 22 | Pigment dispersion 24 | A | A | A | B | A |
| Example 23 | Pigment dispersion 25 | A | A | A | B | A |
| Example 24 | Pigment dispersion 26 | B | B | B | B | B |
| Example 25 | Pigment dispersion 27 | B | B | B | B | A |
| Example 26 | Pigment dispersion 31 | A | A | A | A | B |
| Example 27 | Pigment dispersion 9 | B | B | A | B | B |
| Example 28 | Pigment dispersion 9 | B | B | B | A | B |
| Example 29 | Pigment dispersion 10 | B | B | A | B | B |
| Comparative Example 1 | Pigment dispersion 28 | B | B | B | B | D |
| Comparative Example 2 | Pigment dispersion 29 | D | D | D | D | B |
| Comparative Example 3 | Pigment dispersion 30 | B | D | B | D | D |
| Comparative Example 4 | Pigment dispersion 9 | B | B | B | D | C |

TABLE 4-continued

| Ink | Type | Pigment dispersions Initial viscosity | Pigment dispersions Storage stability | Ink Initial viscosity | Ink Storage stability | Image density |
|---|---|---|---|---|---|---|
| Comparative Example 5 | Pigment dispersion 10 | B | B | B | B | C |
| Comparative Example 6 | Pigment dispersion 11 | B | B | B | D | C |
| Comparative Example 7 | Pigment dispersion 12 | B | B | B | B | C |
| Comparative Example 8 | Pigment dispersion 32 | D | D | D | D | D |

The aspects of the present invention are, or example, as follows.

<1> An inkjet recording ink, including:
water;
a water-soluble solvent;
a pigment; and
a phosphate group-containing copolymer,
wherein the phosphate group-containing copolymer includes a structural unit represented by the following general formula (1) and a structural unit represented by the following structural formula (1):

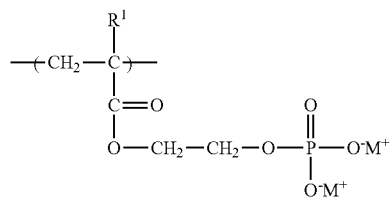

General formula (1)

wherein, in the general formula (1), $R^1$ represents either of a hydrogen atom and a methyl group; and $M^+$ represents any of an alkali metal ion, an organic ammonium ion, an organic amine ion and a hydrogen ion, one-half or more of the $M^+$ in the copolymer is an alkali metal ion, an organic ammonium ion or an organic amine, and the remainder is a hydrogen ion:

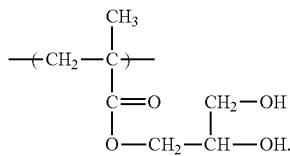

Structural formula (1)

<2> The inkjet recording ink according to <1>, wherein a content of the structural unit represented by the general formula (1) in the phosphate group-containing copolymer is 10% by mass to 60% by mass.

<3> The inkjet recording ink according to <1> or <2>, wherein a viscosity of a 10% by mass aqueous solution of the phosphate group-containing copolymer is 4.0 mPa·s to 30.0 mPa·s at 25° C.

<4> The inkjet recording ink according to any one of <1> to <3>, wherein the phosphate group-containing copolymer is a polymerization product formed between a monomer represented by the following general formula (2) and a monomer represented by the following structural formula (2):

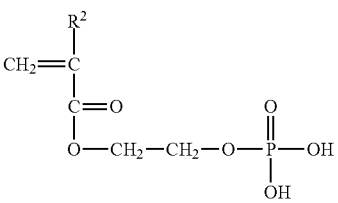

General formula (2)

wherein, in the general formula (2), $R^2$ represents either of a hydrogen atom and a methyl group;

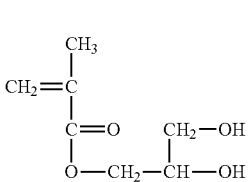

Structural formula (2)

<5> An ink cartridge, including:
a vessel; and
the inkjet recording ink according to any one of <1> to <4> housed in the vessel.

<6> An inkjet recording method, including:
recording an image by applying a stimulus to the inkjet recording ink according to any one of <1> to <4> to allow the inkjet recording ink to fly.

<7> An inkjet recording apparatus, including:
the inkjet recording ink according to any one of <1> to <4>; and
an ink flying unit configured to record an image by applying a stimulus to the inkjet recording ink to allow the inkjet recording ink to fly.

<8> An ink recorded matter, including:
a recording medium; and
an image on the recording medium,
wherein the image is recorded on the recording medium with the inkjet recording ink according to any one of <1> to <4>.

This application claims priority to Japanese application No. 2013-051462, filed on Mar. 14, 2013 and incorporated herein by reference.

What is claimed is:
1. An inkjet recording ink comprising:
water;
a water-soluble solvent;
a pigment; and a phosphate group-containing copolymer, comprising a structural unit represented by general formula (1) and a structural unit represented by structural formula (I), wherein general formula (1) is:

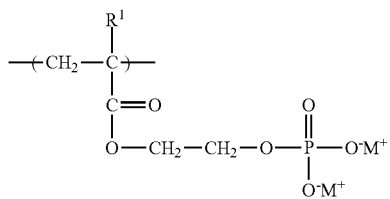

General formula (1)

wherein, $R^1$ represents either a hydrogen atom or a methyl group; and $M^+$ represents any of an alkali metal ion, an organic ammonium ion, an organic amine ion or a hydrogen ion, wherein half or more of the $M^+$ in the phosphate group-containing copolymer is an alkali metal ion, an organic ammonium ion or an organic amine, and the remainder is a hydrogen ion and wherein structural formula (1) is:

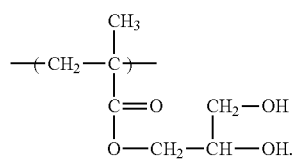

Structural formula (1)

2. The inkjet recording ink according to claim 1, wherein a content of the structural unit represented by the general formula (1) in the phosphate group containing copolymer is 10% by mass to 60% by mass.

3. The inkjet recording ink according to claim 1, wherein a viscosity of a 10% by mass aqueous solution of the phosphate group-containing copolymer is 4.0 mPa·s to 30.0 mPa·s at 25° C.

4. The inkjet recording ink according to claim 1, wherein the phosphate group-containing copolymer is a polymerization product formed between a monomer represented by general formula (2) and a monomer represented by structural formula (2), wherein general formula (2) is:

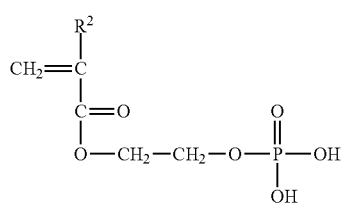

General formula (2)

wherein, $R^2$ represents either a hydrogen atom or a methyl group;

and wherein structural formula (2) is:

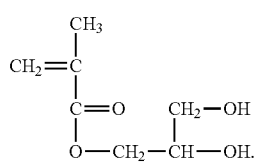

Structural formula (2)

5. An ink cartridge comprising:

a vessel; and an inkjet recording ink housed in the vessel, wherein the inkjet recording ink comprises:

water;

a water-soluble solvent;

a pigment; and a phosphate group-containing copolymer, comprising a structural unit represented by general formula (1) and a structural unit represented by structural formula (1), wherein general formula (1) is:

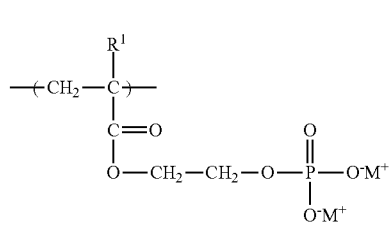

General formula (1)

wherein, $R^1$ represents either a hydrogen atom or a methyl group; and $M^+$ represents any of an alkali metal ion, an organic ammonium ion, an organic amine ion or a hydrogen ion, wherein half or more of the $M^+$ in the phosphate group-containing copolymer is an alkali metal ion, an organic ammonium ion or an organic amine, and the remainder is a hydrogen ion, and wherein structural formula (1) is:

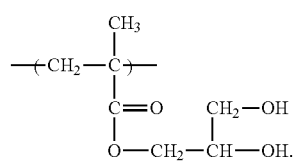

Structural formula (1)

6. An inkjet recording apparatus comprising:

an inkjet recording ink; and an ink flying unit configured to record an image by applying a stimulus to the inkjet recording ink to allow the inkjet recording ink to fly, wherein the inkjet recording ink comprises:

water;

a water-soluble solvent;

a pigment; and a phosphate group-containing copolymer, comprising a structural unit represented by general formula (1) and a structural unit represented by structural formula (I), wherein general formula (1) is:

General formula (1)

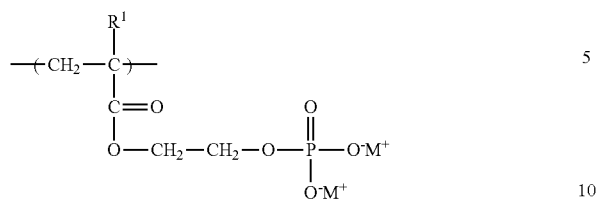

wherein, $R^1$ represents either a hydrogen atom or a methyl group; and $M^+$ represents any of an alkali metal ion, an organic ammonium ion, an organic amine ion or a hydrogen ion, wherein half or more of the $M^+$ in the phosphate group-containing copolymer is an alkali metal ion, an organic ammonium ion or an organic amine, and the remainder is a hydrogen ion
and wherein structural formula (1) is:

Structural formula (1)

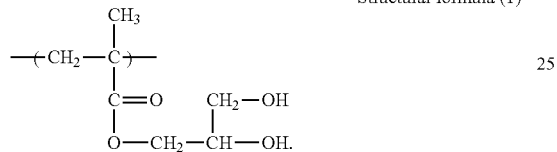

\* \* \* \* \*